UNITED STATES PATENT OFFICE 2,630,365

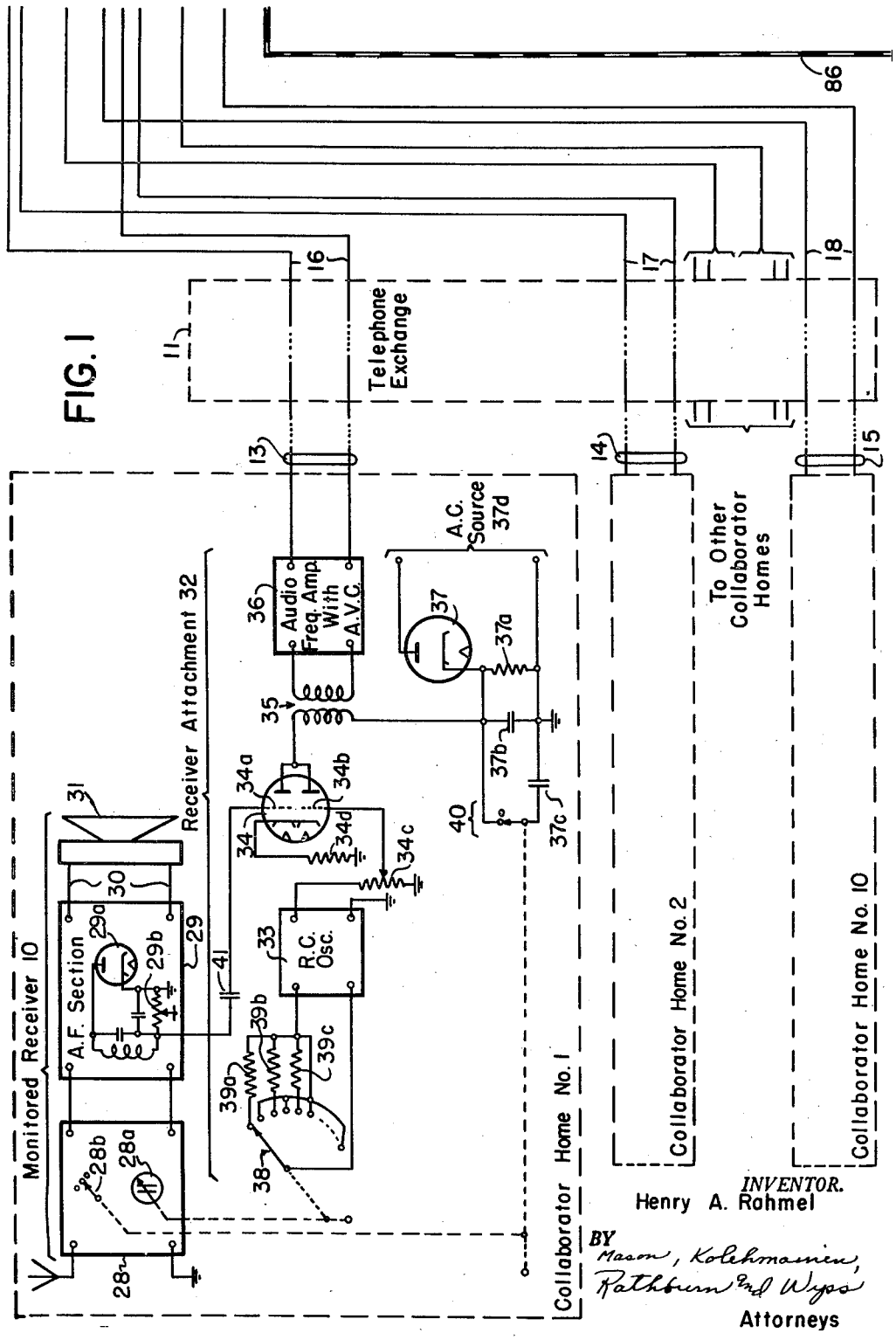

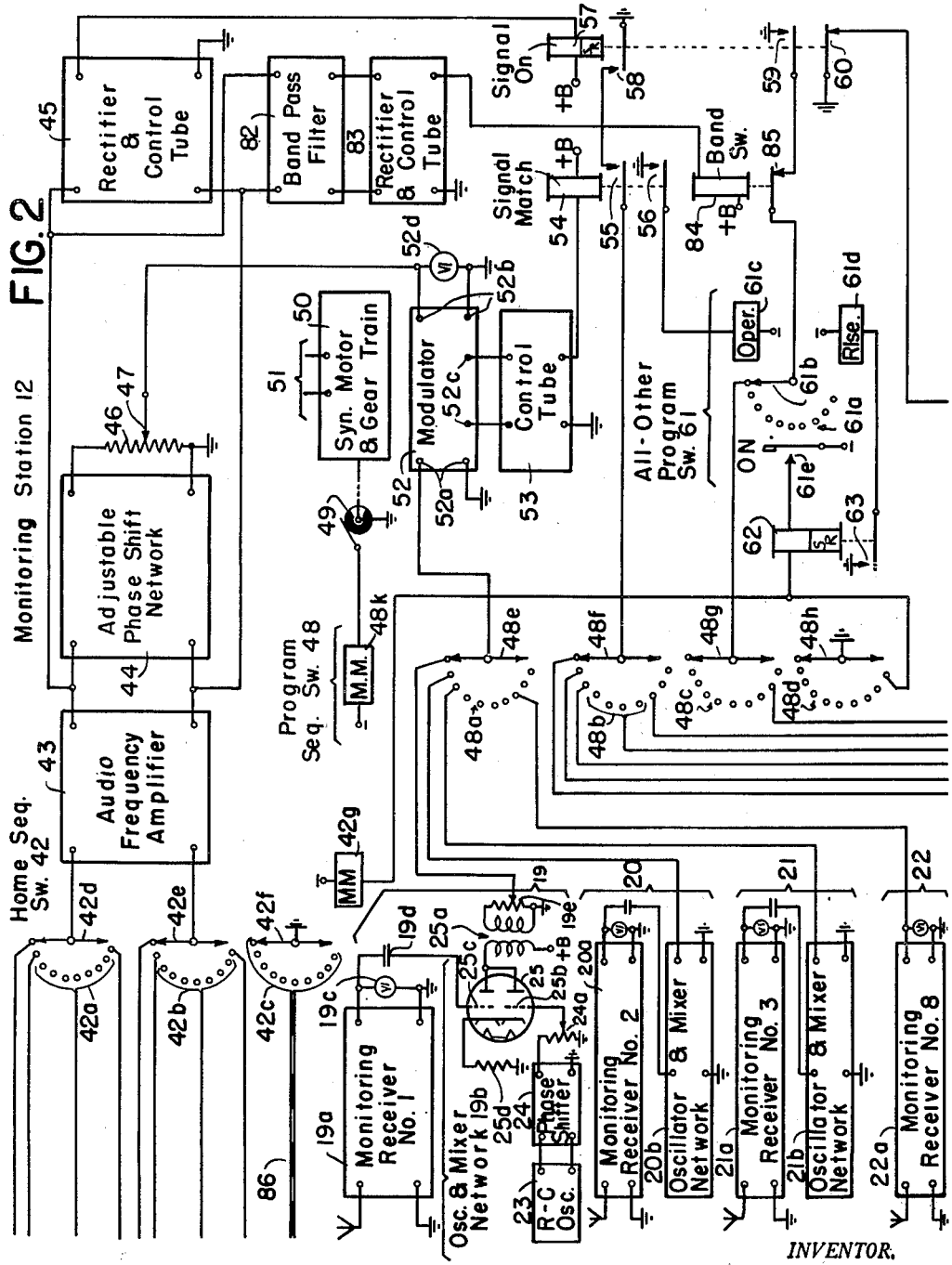

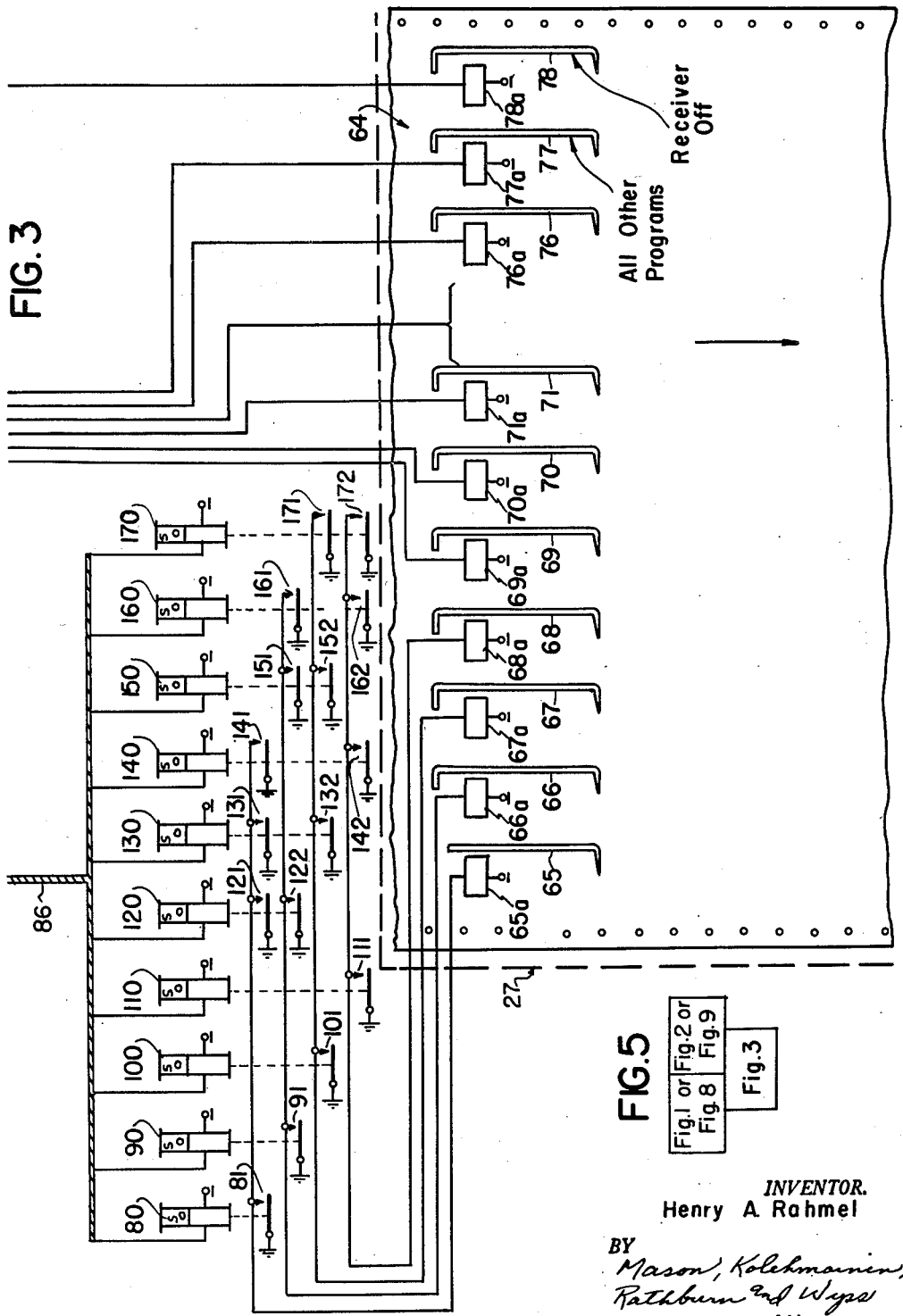

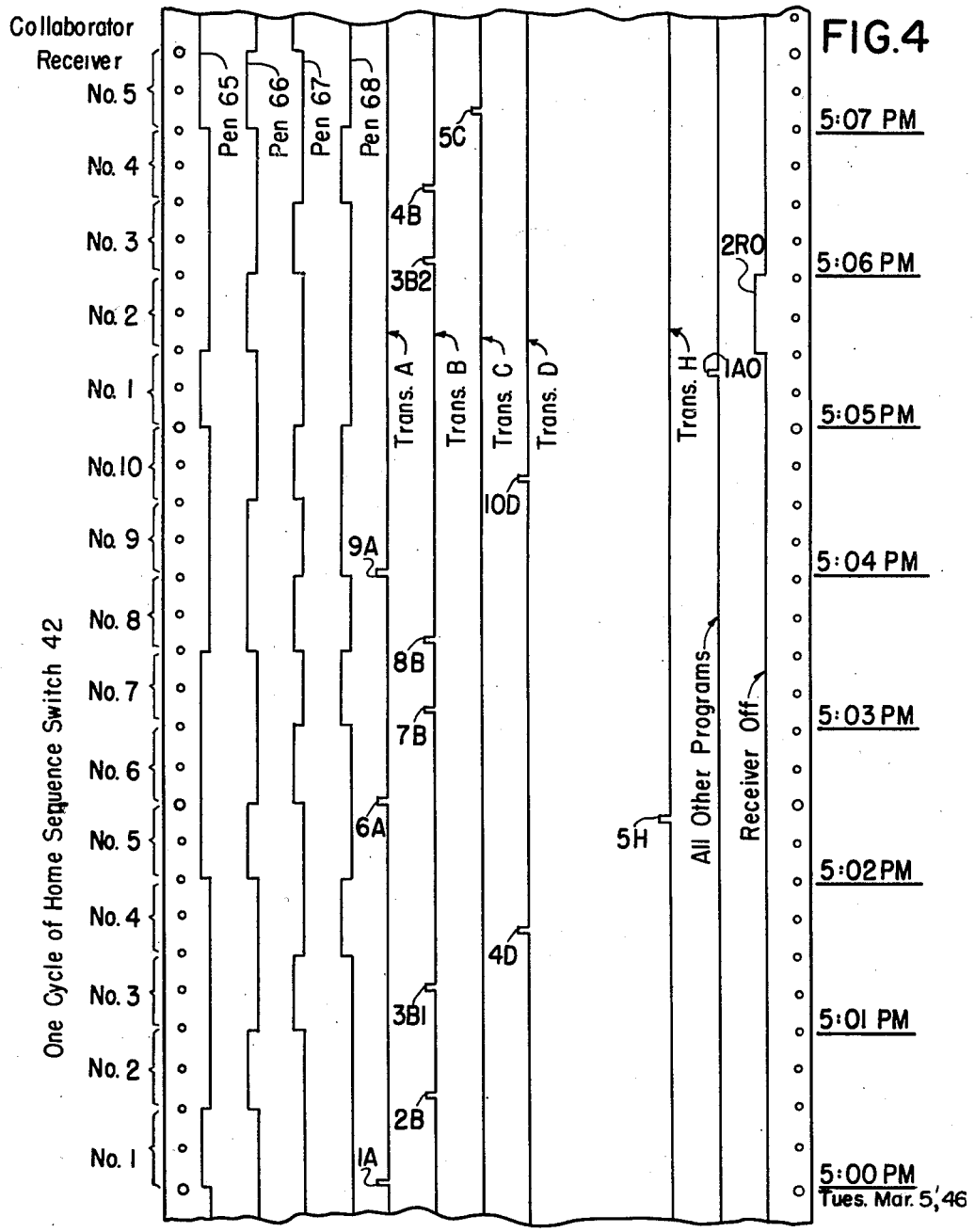

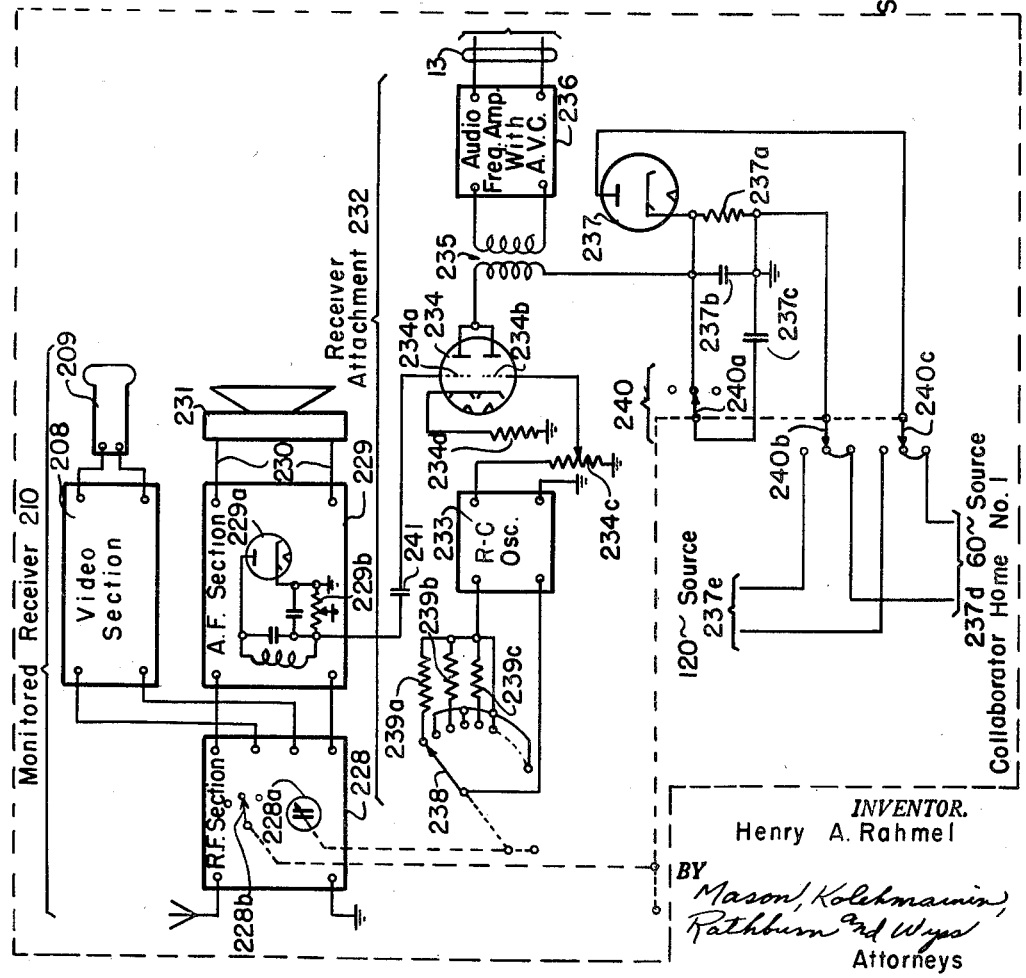

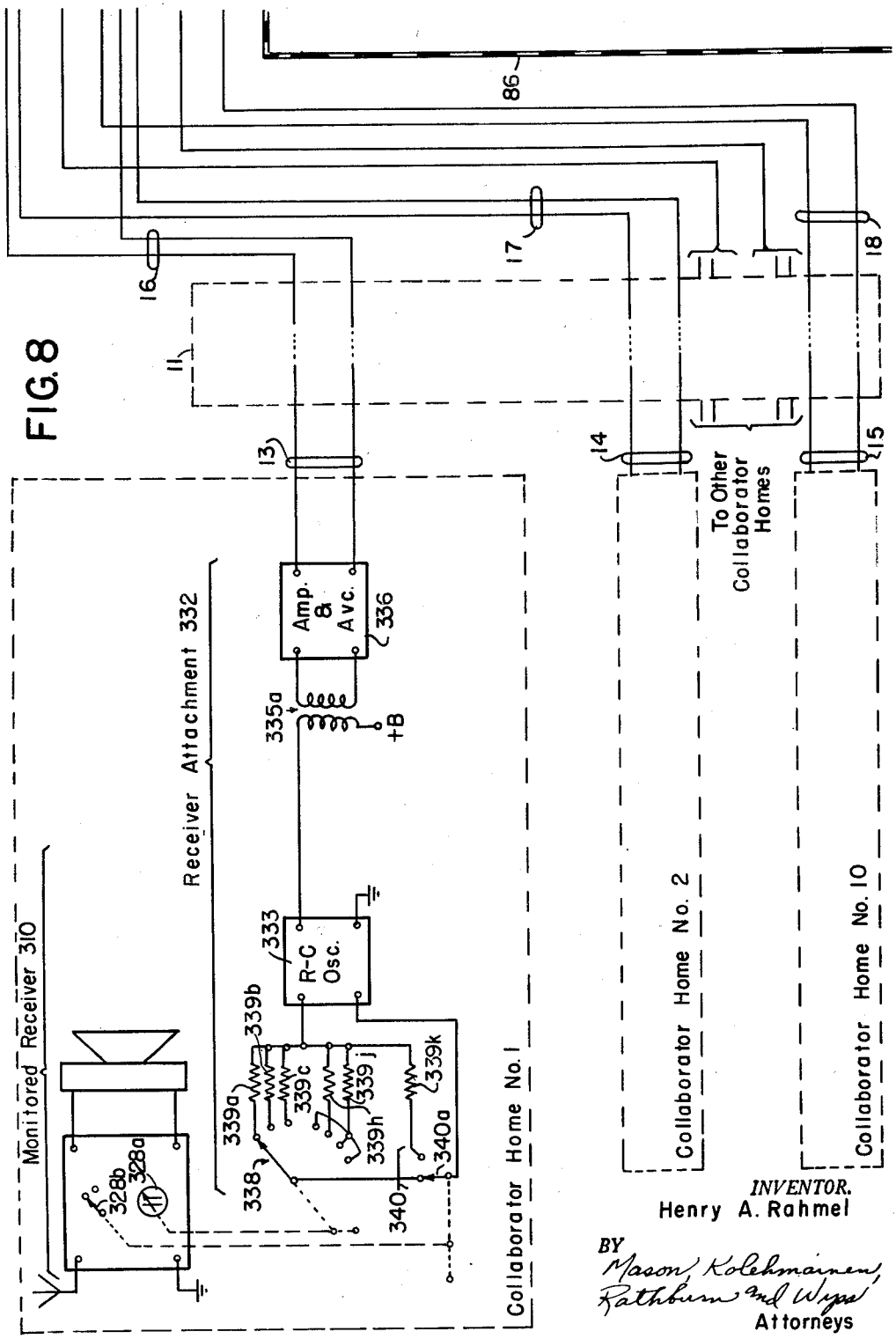

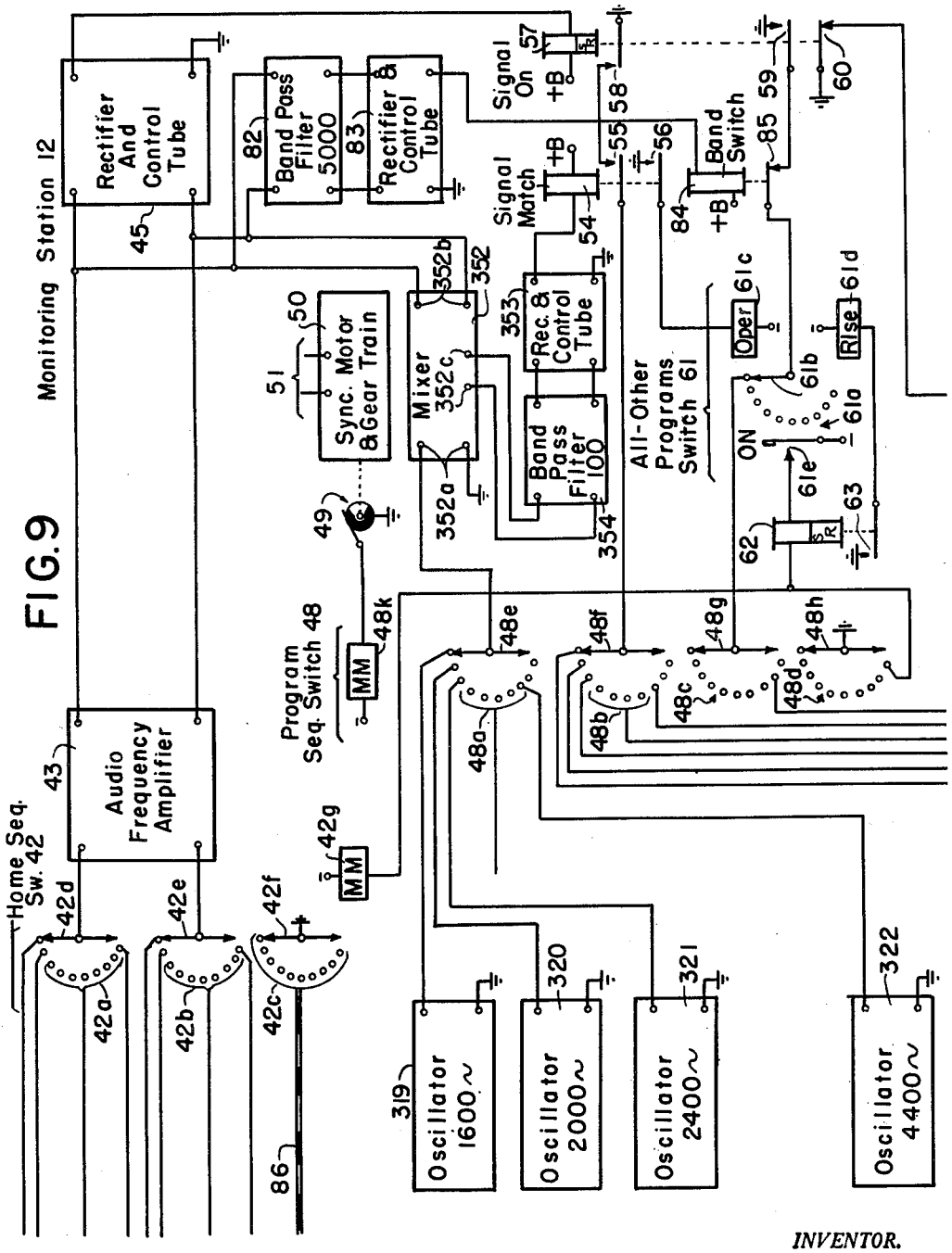

SYSTEM FOR DETERMINING LISTENING HABITS OF RADIO RECEIVER USERS

Henry A. Rahmel, Evanston, Ill., assignor to A. C. Nielsen Company, Chicago, Ill., a corporation of Illinois Application May 19, 1949, Serial No. 94,116

11 Claims. (Cl. 346—37)

The present invention relates to wave signal receiver monitoring systems and more particularly to an improved system for monitoring one or more wave signal receivers to determine the extent of use of each receiver and the particular transmitting stations from which program signals are received and translated by each receiver. In particular, the present improved system is well adapted for use in determining the listening habits of wave signal receiver users. This application is a continuation-in-part of applicant's copending application Serial No. 708,861, filed November 9, 1946, and assigned to the same assignee as the present invention.

One of the principal objectives in determining the listening habits of home radio receiver users is that of determining the effectiveness of radio advertising. Generally speaking, the effectiveness of any particular program as an advertising media is directly related to the following factors:

1. The average size of the listening audience.
2. The average period of listening to a particular program, i. e., the "holding power" of the program.
3. Variations in the size of the listening audience on a periodic basis in order (a) to permit detection of program components which cause audience gains or losses, (b) to determine which types of commercial message cause audience loss, and (c) to locate commercials during program periods when the audience is large.

The first method of sampling used in attempts to obtain this information is the so-called telephone-call method which involves the making of hundreds of personal telephone calls to random selected homes during the period when a particular program of interest is in progress and statistical analysis of the results to determine the extent of listening. In addition to the uncontrolled uncertainties introduced by human judgment, there are, basically, a number of defects in this method which destroy the accuracy of the results obtained. Thus it is entirely impossible to obtain information concerning factors 2 and 3 above when this method of sampling is used. These defects have led to the development of instrumented methods of sampling which do not require active audience collaboration, provide a great deal more important information than the telephone-call sampling technique, and eliminate entirely the errors inherent in the telephone-call sampling technique.

In general, instrumented systems now in use involve the use of a recording device operating in conjuction with each collaborator receiver used in the sampling system to record the extent of use of the receiver and to record, as a function of time, the transmitters to which the receiver is tuned for program reception. While systems of the character described have in practice produced entirely satisfactory results, they are relatively expensive in instrument cost and maintenance due to recorder duplication at the collaborator homes and the fact that relatively frequent service calls at each of a large number of collaborator homes are required in order to collect the recorded information and check the operation of the recorder provided in the home.

In accordance with the invention disclosed in applicant's copending application referred to above, the program identification operation is simplified by a system of program signal matching wherein the program signals being received at each monitored receiver are transmitted to a remote monitoring station and are successively matched or compared with the program signals being received by a plurality of monitoring receivers which are respectively tuned for program signal reception from a plurality of different wave signal transmitters operating at different frequencies, and an indication identifying the program being received is produced only when a match is established. While this improved system provides for positive identification of the particular program being received by each monitored receiver, it does not solve the so-called overlap problem, i. e., the problem of positively identifying the particular transmitting station from which a particular program is received by a particular receiver when the receiver is capable of receiving the same program concurrently from two or more different transmitting stations. Also, the system fails to distinguish between the same audio program as transmitted to a combination radio and television receiver either from a television transmitter operating at a carrier frequency in the television band or from an AM or FM transmitter operating in the broadcast or FM band. Moreover, the system arrangement is such that at least one and preferably several monitoring receivers must be used at the monitoring station.

It is an object of the present invention, therefore, to provide a new and improved system for monitoring the use and operation of one or more wave signal receivers.

It is a further object of the invention to provide a system of the character described which includes facilities for overcoming the above-described overlap problem in a simple and reliable manner.

According to a further object of the invention facilities are provided in the system for distinguishing between reception by a monitored receiver of a given program from a television transmitter and reception of the same program by the same receiver from an FM or AM transmitter. More generally, it is an object of the invention to provide facilities in the system distinguishing between the bands (FM, AM, Police, and television) over which a multi-band monitored receiver may be tuned for program signal reception.

It is still another object of the invention to provide a system of the character described which utilizes the principle of signal comparison to determine the transmitting stations to which the monitored receivers are respectively tuned for program signal reception and yet does not require the use of monitoring receivers at the monitoring station.

The invention, both as to its organization and method of operation, together with further objects and advantages thereof, will best be understood by reference to the following specification taken in connection with the accompanying drawings in which:

Figs. 1, 2 and 3 when arranged in the manner shown in Fig. 5 illustrate a wave signal receiver monitoring system characterized by the features of the present invention;

Fig. 4 illustrates a typical record segment resulting from operation of the system;

Fig. 6 illustrates a modified arrangement of the receiver attachment provided at one or more monitored receivers of the system;

Fig. 7 illustrates a modified arrangement of the apparatus provided at the monitoring station of the system which is used when the receiver attachment of Fig. 6 is employed at one or more monitored receivers of the system;

Fig. 8 illustrates a second modified arrangement of the receiver attachment provided at one or more monitored receivers of the system; and Fig. 9 illustrates a modified arrangement of the apparatus provided at the monitoring station of the system which is used when the receiver attachment of Fig. 8 is employed at one or more monitored receivers of the system.

Referring now to the drawings and more particularly to Figs. 1, 2 and 3 thereof, the present improved system is illustrated as employed to monitor and provide record information at a monitoring station 12 of the particular programs being received at each of a plurality of wave signal receivers 10, etc., respectively located in ten different collaborator homes. The ten monitored wave signal receivers 10, etc., respectively provided at the different collaborator homes are illustrated as being of the multi-band type and each may be tuned for the reproduction of program signals derived from different transmitters operating at different frequencies in each of two different frequency bands and carrying different programs. These signals as respectively derived from the several receivers are transmitted to the monitoring station 12 by way of voice frequency communication channels which commonly extend through a telephone exchange 11. Thus, program signals derived from the receiver 10 are transmitted to the monitoring station 12 over a first two-wire audio frequency communication channel 13, a connection within the telephone exchange 11 and a second two-wire audio frequency communication channel 16. Similarly, telephonic channels 14 and 17 interconnected through a circuit within the exchange 11 are utilized in the transmission of program signals from the radio receiver located at the collaborator home No. 2 to the monitoring station 12. An identical channel comprising a pair of two-wire sections 15 and 18 connected within the exchange 11 is similarly utilized to interconnect the wave signal receiver provided at the collaborator home No. 10 with the monitoring station 12. If desired from an economic standpoint, radio or carrier links may be used in transmitting the program signals from the various collaborator homes to the monitoring station 12.

The monitored receivers 10, etc., as provided at the different collaborator homes may, of course, be of any commercial type. Regardless of this fact, however, all known commercial receivers are equipped with audio frequency sections in which the program signals are detected, amplified and transmitted to the driving coil of a loud speaker or equivalent electrical transducer for reproduction. Thus, the receiver 10 as provided at the collaborator home No. 1 may be of the well known multi-band superheterodyne type and comprises a radio or high frequency section 28 and a program signal or audio frequency section 29, the output terminals of which are connected by way of the voice coil leads 30 to a loud speaker 31. The audio frequency section 29 of the receiver 10 conventionally includes a diode detector 29a having a load resistor 29b across which the program signal, i. e., the audio frequency components of a received signal, are developed during reproduction of a received signal. The receiver 10 is also conventionally equipped with the usual tuning facilities, indicated by the tuning condenser 28a, and with band switching facilities indicated by the band switch 28b. For purposes of this discussion, the receivers respectively provided in the other collaborator homes of the system may be assumed to be identical with the receiver 10. Although the system shown in Figs. 1, 2 and 3 of the drawings is herein described in its use to monitor receivers of the audio reproducing type, it will be understood from the following explanation that it is equally applicable for use in monitoring receivers of the visual reproducing type, i. e., television receivers. For the purpose of feeding program signals derived from the audio frequency section 29 of the receiver 10 to the signal transmission channel 13, a receiver attachment 32 is provided which comprises a step tuned resistance-capacitance oscillator 33, a mixer stage 34, an output transformer 35, an audio frequency amplifier 36 equipped with automatic volume control facilities and a power supply unit including a diode rectifier 37. The mixer tube 34 is in the form of a double triode having one grid 34a coupled to the top of the automatic volume control load resistor 29b of the receiver 10 through a coupling condenser 41. The second grip 34b of the tube 34 is coupled to the output side of the oscillator 33 through an adjustable voltage dividing potentiometer 34c. The cathode of the tube 34 is self-biased to the proper operating potential by means of a conventional cathode biasing resistor 34d and the output signal developed at the parallel connected anodes of the tube 34 is fed to the input terminals of the audio frequency amplifier 36 through the coupling transformer 35.

In order to provide an indication at the monitoring station 12 that the receiver 10 is conditioned for signal reception in a frequency band other than the broadcast band, for example, facilities are provided for injecting into the signal impressed upon the input terminals of the amplifier 36 a small component of the voltage derived from an alternating current source 37d. More specifically, anode current is normally supplied to the two anodes of the mixer tube 34 from the load circuit of the diode rectifier 37. This load circuit comprises a load resistor 37a included in the cathode leg of the tube 37 which is permanently paralleled by a small filter condenser 37b. The resistor 37a and the filter condenser 37b are also arranged to be selectively shunted by a large filter condenser 37c under the control of a two-position switch 40. This switch is mechanically connected with the operating shaft of the band switch 28b in such a way that so long as the band switch 28b is in the position corresponding to the broadcast band, for example, the switch 40 is closed. When, however, the band switch 28b is operated to condition the receiver 10 for signal reception in any band other than the broadcast band, the switch 40 is actuated to disconnect the large filter condenser 37c from across the small filter condenser 37b and the rectifier load resistor 37a.

In order to overcome the overlap problem described in the introductory portion of the specification, the oscillator 33 is selectively controlled in accordance with the tuning of the receiver 10 to remain inactive, i. e., produce no output voltage, when the receiver 10 is tuned for program signal reception from any transmitter which cannot carry the same program as another transmitter, and to develop discretely different audio frequency signals to identify program signal reception from particular transmitters which may carry the same programs as other transmitters. To this end, the frequency control circuit of the oscillator 33 is arranged selectively to include resistors 39a, 39b, 39c of different resistance values under the control of a multi-point rotary switch 38 which is mechanically connected for ganged operation with the tuning condensers 28a of the receiver 10. Preferably the oscillator 33 is of the character disclosed and claimed in copending application Ser. No. 7,647, Rahmel et al., filed February 11, 1948, and assigned to the same assignee as the present invention. The switch 38 is preferably of the character disclosed and claimed in copending application Ser. No. 78,921, Krahulec, filed March 1, 1949, and assigned to the same assignee as the present invention. The other components of the receiver attachment 32 may be entirely conventional. Preferably, 60 cycle current is supplied to the tube 37 and the power pack, not shown, of the receiver attachment 32 from the power supply unit of the receiver 10 in such a manner that when the receiver 10 is turned on, the receiver attachment 32 is fully energized and ready for operation. This may conveniently be accomplished by connecting the bracketed leads 37b and the other current supply leads, not shown, of the receiver attachment 32 to the input terminals of the power pack in the receiver 10 so that when the on-off switch of the receiver is turned off the receiver attachment 32 is deenergized and when the on-off switch of the receiver 10 is turned on, the receiver attachment 32 is energized in condition for signal transmission to the channel 13.

As will be evident from the above explanation, when the receiver 10 is turned on for signal reception and reproduction, the oscillator 33, mixer tube 34, amplifier 36 and power supply tube 37 are all energized to condition the receiver attachment 32 for operation. Assuming that the band switch 28b of the receiver is in the illustrated position wherein the receiver is conditioned for program signal reception from transmitters operating in the broadcast band, the switch 40 occupies its illustrated setting wherein the large filter condenser 37c is connected in shunt with the small filter condenser 37b. With the condenser 37c thus included in the filter circuit, the 60 cycle ripple component developed across the load resistor 37a is reduced to a negligible value such that it is not impressed upon the plates of the mixer tube 34 through the primary winding of the coupling transformer 35. More particularly, this ripple component is not injected into the input circuit of the amplifier 36 with sufficient amplitude to be detectable at the monitoring station 12. In this regard, it will be understood that the rectified voltage developed across the diode lead resistor 37a and as filtered by the two parallel connected condensers 37b and 37c is positively applied as an operating potential to the connected anodes of the tube 34 through the primary winding of the coupling transformer 35.

Assuming that the receiver 10 is tuned for program signal reception from a transmitter which is broadcasting a program that cannot be received by the receiver 10 from any other transmitter, such, for example, as a non-network station, the rotary switch 38 is adjusted by the tuning shaft of the receiver to a position wherein the wiper thereof engages one of the short circuiting contacts of the associated contact strip to short circuit the frequency determining circuit of the oscillator 33. Adjustment of the switch 38 to this setting is, of course, effected in response to operation of the tuning condensers 28a to the particular setting wherein program signals are received from the desired transmitting station. In this regard, it is pointed out that the switch 38 is equipped with contacts for short circuiting the frequency determining circuit of the oscillator 33 in all tuning positions of the receiver 10 excepting those which correspond to program signal reception from transmitters which may be carrying the same programs as other transmitters. In other words, the frequency determining circuit of the oscillator 33 is short circuited in each tuning position of the receiver 10 except those tuning positions which represent program signal reception from particular transmitters broadcasting programs that may be received by the receiver 10 from other transmitters.

With the frequency determining circuit of the oscillator 33 short circuited, this oscillator produces no output signal. Accordingly, no signal voltage is impressed upon the grid 34b of the mixer tube 34. However, the audio signal voltage developed across the automatic volume control resistor 29b of the receiver 10 is impressed upon the grid 34a of the mixer tube 34 through the coupling condenser 41. Thus the program signals developed in the audio frequency section of the receiver 10 and reproduced by the loud speaker 31 of the receiver are also repeated by the mixer tube 34 through the coupling transformer 35 to the input terminals of the amplifier 36. This amplifier increases the signal level to the desired value, holds this level substantially constant and impresses the amplified program signal upon the channel 13 for transmission to the monitoring station 12.

As indicated above, when the receiver 10 is tuned to receive program signals from one particular transmitter which is broadcasting the same program as a second transmitter from which program signals may also be received by the receiver 10, the wiper of the rotary switch 38 is positioned by the tuning shaft of the receiver to include a corresponding one of the resistors 39a, 39b and 39c in the frequency determining circuit of the oscillator 33. Assuming that the resistor 39a is thus included in the frequency determining circuit of the oscillator 33, this oscillator is rendered operative to produce an output signal of a particular audio frequency uniquely identifying the transmitter from which program signals are being received by the receiver 10. By way of example, it may be assumed that the oscillator 33 produces output signals having frequencies of 3500 cycles, 4000 cycles and 4500 cycles when the resistors 39a, 39b and 39c are respectively included in the frequency determining circuit of this oscillator. In the case under consideration, therefore, a signal voltage of 3500 cycles appears across the output terminals of the oscillator 33 and the potentiometer resistor 34c. A portion of this voltage is impressed upon the grid 34b of the mixer tube 34. Thus the audio frequency program signal derived from the receiver 10 and impressed upon the grid 34a and the transmitter identification signal of 3500 cycles impressed upon the grid 34b are electronically mixed in the tube 34 to produce a composite output signal having a particular frequency composition which uniquely identifies the particular program being received and also the particular transmitting station from which the program is being received. The composite signal is amplified through the amplifier 36 and impressed upon the channel 13 for transmission to the monitoring station 12.

In a manner clearly apparent from the above explanation, the resistors 39b and 39c may selectively be included in the frequency determining circuit of the oscillator 33 under the control of the tuning shaft of the receiver 10 to correspondingly control the output frequency of this oscillator in response to tuning of the receiver 10 for program signal reception from the particular transmitting stations to which the resistors 39b and 39c respectively correspond. With the arrangement illustrated, facilities are provided for positively identifying three specific transmitters from which program signals may be received by the receiver 10. Each of these three transmitters may at times broadcast the same program as another transmitter operating within the radius of reception of the receiver 10. More specifically, the arrangement is such that when the receiver 10 receives a particular program from one of two transmitters both carrying the same program, the program signal is alone transmitted to the monitoring station 12 over the channel 13 when the receiver 10 is tuned to receive the program from one of the transmitters, whereas the same program signal composited with a particular transmitter identification signal is transmitted over the channel 13 to the monitoring station 12 when the receiver 10 is tuned to receive the program from the second transmitter. Thus if the overlap problem as encountered at collaborator home No. 1 only exists on a two transmitter basis, i. e., not more than two transmitters capable of being received by the receiver 10 can at any time carry the same program, the illustrated facilities of the receiver attachment 32 provide for discrimination between three such pairs of transmitters. On the other hand, if three transmitters capable of being received by the receiver 10 at times carry the same program, then two of the three resistors 39 should be used to effect the production of transmitter identification signals by the oscillator 33 which uniquely identify two of the three transmitters. It will thus be understood that the illustrated arrangement has great flexibility in solving the described overlap problem.

In the event the band switch 28b of the receiver 10 is operated to condition the receiver for signal reception from a transmitter operating in a band other than the broadcast band, the switch 40 is operated to its open circuit setting to disconnect the large filter condenser 37c from across the small filter condenser 37b. This has the effect of injecting into the signal voltage applied to the input terminals of the amplifier 36 a 60 cycle ripple component of sufficient amplitude to be detectable at the monitoring station 12. This 60 cycle ripple voltage is of course intermixed in the mixer tube 34 with the audio frequency voltage derived from the receiver 10 and possibly with the signal voltage output of the oscillator 33, so that a composite signal voltage is in effect transmitted over the channel 13 to the receiver 12. However, and as explained more fully below, the 60 cycle ripple component positively indicates to the equipment at the monitoring station 12 that the monitored receiver 10 is conditioned for signal reception from a transmitter operating in a frequency band other than the broadcast band.

It will be understood that identical receiver attachments are provided in association with each of the other collaborator receivers. These receiver attachments respectively deliver to the channels 14, 15, etc., pure audio frequency signals or composite signals indicative of the transmitting stations to which the respective associated receivers in the collaborator homes are tuned for program signal reception. The purpose of coupling each receiver attachment to the detector diode load resistor of the associated receiver in the manner described above is that of insuring a substantial constant signal input level to each of the channels 13, 14, 15, etc. Constancy of the signal input level to each of the channels 13, 14, 15, etc., is further insured by equipping audio frequency amplifier 36 of each receiver attachment with automatic volume control facilities. By maintaining the signal input levels to these channels substantially constant at the same value, cross-feed between the channels extending through the telephone exchange 11 is prevented. If radio links are used for signal transmission purposes, the volume control facilities of the receiver attachments prevent overmodulation of the signal carriers.

At the monitoring station 12, the audio or composite signals of unknown signal pattern as derived from the monitored receivers 10, 10a, etc., are successively and sequentially compared with the audio or composite signals of known signal pattern derived from a plurality of monitoring units 19, 20, 21, 22, etc. In the illustrated system these monitoring units include monitoring wave signal receivers 19a, 20a, 21a, 22a, etc., which are individually and continuously tuned to monitor different wave signal transmitters. In other words, the monitoring receiver 19a is tuned continuously to receive program signals radiated from one particular transmitter, the second monitoring receiver 20a is tuned continuously to receive programs originating at a second transmitter, the monitoring receiver 21a is tuned continuously to receive program signals originating at a third transmitter, and so on. The monitoring receivers may be of any desired commercial type, each being provided with suitable tuning facilities, volume control facilities, and an audio frequency channel over which the program signals are delivered to the output terminals of the receiver. Provisions are made in the system for comparing the signals derived from the ten monitored receivers 10, 10a, etc., with the signals reproduced by as many as eight monitoring units which respectively receive programs from eight different wave signal transmitters hereinafter arbitrarily designated as transmitters A, B, C, D, E, F, G and H.

The monitoring units 19, 20, 21, etc., provided to monitor transmitters which may at times broadcast the same programs as other transmitters, also respectively include oscillator and mixer networks 19b, 20b and 21b which respectively cooperate with the monitoring receivers 19a, 20a and 21a to produce composite output signals of the same frequency composition as the composite signals transmitted to the monitoring station 12 from the monitored receivers in the collaborator homes. In order more clearly to explain the purpose of the oscillator and mixer networks, it may be assumed that the transmitters A, B and C at times respectively carry the same programs as the transmitters D, E and F. It may also be assumed that in order to distinguish between program signal reception by the receiver 10 from the transmitters A and D, for example, the oscillator 33 is controlled by the frequency determining resistor 39a to produce the described 3500 cycle output frequency when the receiver 10 is receiving program signals from the transmitter A and is controlled to have no output signal when the receiver 10 is receiving program signals broadcast by the transmitter D. It may further be assumed that the transmitter identification signal of 4000 cycles is produced by the oscillator 33 when the receiver 10 is operating to receive program signals from the transmitter B and that this oscillator produces no output signal when this receiver 10 is tuned to receive signals from the transmitter E. Similarly, it may be assumed that the oscillator 33 produces the output signal of 4500 cycles when the receiver 10 is tuned for program signal reception from the transmitter C and is controlled to produce no output signal when this receiver is tuned to receive program signals from the transmitter E. Under these assumptions, the monitoring unit 19, in order to produce a composite signal matching that developed by the receiver attachment 32 when the receiver 10 is tuned to receive program signals from the transmitter A, must reproduce the program signals broadcast by the transmitter A and mix the same with a 3500 cycle signal in a manner such that the particular phase and amplitude relationship between the two signals mixed by the receiver attachment 32 is duplicated in mixing the signals within the monitoring unit 19. To this end, the oscillator and mixer network 19b is provided. This network comprises a fixed tuned resistance-capacitance oscillator 23, a phase shifter 24, a mixer tube 25, an output transformer 25a and a voltage dividing potentiometer 19e. The signal developed by the oscillator 23 is fixed at a value of 3500 cycles and after being displaced in phase by the proper amount in the manner explained below, is in part impressed upon the lower grid 25b of the mixer tube 25 through the potentiometer resistor 24a. The upper grid 25c of the mixer tube is coupled to the output circuit of the monitoring receiver 19a through the coupling condenser 19d. The two connected cathodes of the mixer tube 25 are self-biased to the proper operating potential by means of a conventional cathode biasing resistor 25d.

With the described arrangement of the monitoring unit 19, the audio frequency components of the signal received from the transmitter A by the monitoring receiver 19a, as reproduced across the output terminals of this receiver, are impressed upon the control grid 25c of the mixer tube 25 through the coupling condenser 19d. Concurrently the 3500 cycle signal developed across the potentiometer resistor 24a is in part impressed upon the grid 25b of the tube 25. Thus the two signals are electronically mixed within the tube 25 to produce a composite signal of the same frequency composition as the signal produced by the receiver attachment 32 when the receiver 10 is tuned for program signal reception from the transmitter A. This composite signal is developed across the output terminals of the monitoring unit 19, namely across the output terminals of the potentiometer resistor 19e. In order to match the phase relationship between the two signals electronically mixed by the tube 25 with the phase relationship between the two signals electronically mixed by the mixer tube 34, for example, the phase shifter 24 is manually adjusted until the composite signal pattern as developed across the output terminals of the transformer 25a (and as seen on an oscilloscope) precisely matches the pattern of the signal transmitted to the monitoring station 12 from the receiver attachment 32, for example, when the receiver 10 is tuned for program signal reception from the transmitter A. In a similar manner, the oscillator and mixer networks 20b and 21b are utilized to effect the production of composite signals which respectively match the composite signals produced by the receiver attachment 32, for example, when the receiver 10 is tuned for program signal reception from the transmitters B and C, respectively. Under the assumption outlined above, the oscillator of the network 20b will of course be tuned to have an output frequency of 4000 cycles whereas the oscillator of the network 21b will be tuned to have an output frequency of 4500 cycles. The remaining monitoring units 22, etc., provided at the monitoring station 12 may comprise only monitoring receivers such as the receiver 22a tuned continuously to receive and reproduce program signals broadcast by different transmitters.

For the purpose of comparing the signals of unknown audio frequency characteristics or signal patterns derived from the receiver attachments of the monitored receivers 10, 10a, etc., with the audio frequency signals of known signal patterns and representing programs of known identity, as delivered by the monitoring units 19, 20, etc., the signal voltages transmitted to the monitoring station 12 over the respective audio frequency communication channels are successively impressed upon the input terminals of an audio frequency amplifier 43 through the contacts and wipers of a home-sequence switch 42 of the well known rotary type. From the audio frequency amplifier 43, the signals are delivered to the input side of an adjustable phase shift network 44, the output terminals of which are bridged by a potentiometer resistor 46. This resistor is equipped with a sliding wiper 47 which may be adjusted as desired to impress any desired part of the voltage appearing across the resistor 46 upon the input terminals 52b of a modulator 52 in which the signals of unknown pattern are successively compared with the signals of known pattern derived from the several monitoring units 19, 20, etc. Preferably the modulator 52 is of the exact form described in the Bell System Technical Journal, volume 18, 1939, at pages 315 to 337, inclusive. It is provided with a second set of input terminals 52a to which signals from the monitoring units 19, 20, 21, etc., are successively delivered through the contacts and wipers of a program or transmitter sequence switch 48. This modulator is also provided with a set of output terminals 52c which are connected to control the bias impressed between the input electrodes of a control tube 53, the output circuit of which includes the operating winding of a signal match relay 54. More specifically, the modulator 52 is of the well known ring type and is so connected and arranged that an appreciable direct current voltage is developed across the output terminals 52c thereof when signal voltages of matching phase and amplitude are simultaneously impressed across the two sets of input terminals 52a and 52b thereof. This means that an appreciable voltage is developed across the output terminals 52c only when the signals derived from the receiver attachment 32 of one of the monitored receivers 10, 10a, etc., match the signals derived from one of the monitoring units 19, 20, 21, etc. On the other hand, when no signal voltage is impressed across the input terminals 52b or signal voltages of nonmatching phase and amplitude are impressed across the two sets of input terminals of the modulator, no appreciable voltage is developed across the output terminals 52c. The control tube unit 53 may be of any conventional form and has the function of utilizing the direct current voltage impressed upon the input electrodes thereof when matching signal voltages are impressed upon the input terminals of the modulator 52 to produce sufficient current flow through the relay 54 to effect operation of this relay, and of preventing this relay from operating under all other conditions. To this end, the control tube of the unit 53 is normally biased beyond cut-off and the voltage developed across the modulator output terminals 52c during a matching signal period is used to decrease this bias sufficiently to produce operation of the relay 54.

Since the monitored receivers 10, 10a, etc., may each be capable of receiving programs originating at wave signal transmitters other than the transmitters A, B, C, etc., which the monitoring units 19, 20, 21, etc., are respectively provided to monitor, it may not infrequently occur that signals are transmitted to the monitoring station 12 from one or more of the receivers 10, 10a, etc., which do not match the signals developed at the output terminals of any one of the monitoring units 19, 20, 21, etc. In order to record indications of such periods of signal reception at the monitored receivers, means comprising a rectifier and control tube unit 45, a signal-on relay 57 and an all-other-programs switch 61 are provided to operate in conjunction with the program sequence switch 48 in selectively controlling the recording facilities described below. More specifically, the input terminals of the rectifier and control tube unit 45 are bridged across the output terminals of the audio frequency amplifier 43 and the output circuit of this unit is connected serially to include the operating winding of the signal-on relay 57. In brief, the unit 45 includes a rectifier section which functions to rectify signal voltages delivered thereto from the amplifier 43, and a control tube which is biased beyond cut-off by the rectifier signal voltage to prevent the signal-on relay 57 from operating so long as signal input to the amplifier 43 continues. Thus, the relay 57 is only conditioned for operation when no signals appear at the output side of the audio frequency amplifier 43. In this regard, it is noted that anode potentials are supplied to the anodes of the control tubes respectively provided in the units 45 and 53 through the operating windings of the relays 57 and 54, respectively.

As explained above, when the band switch 28b of the receiver 10 is operated to condition the receiver for signal reception from transmitters operating in a band other than the broadcast band, the receiver attachment 32 functions to develop a composite output signal having a 60 cycle component therein of relatively large amplitude. In order to detect this 60 cycle signal component at the monitoring station 12 and to control the recording facilities to produce a record indication which identifies the use of the receiver 10 to receive signals from transmitters operating in bands other than the broadcast band, additional recorder control facilities are provided which include a band pass filter 82, a rectifier and control unit 83 and a band switch relay 84 connected in tandem in the order named. The filter 82 is coupled at its input side directly to the output terminals of the audio frequency amplifier 43 and is sharply tuned to pass only those signal voltages having a frequency of 60 cycles. Thus this filter will pass to the rectifier and control tube unit 83 only the 60 cycle ripple component of any composite signal transmitted to the monitoring station from one of the receiver attachments. The rectifier and control tube unit includes a rectifier section which functions to rectify the 60 cycle signal component passed by the filter 82, and a control tube which is normally biased beyond cutoff to prevent the band switch relay 84 from operating and which has its bias voltage decreased sufficiently by the rectified 60 cycle voltage to produce operation of the band switch relay 84 when the 60 cycle signal is detected and passed by the filter 82. Thus the relay 84 is only operated when the composite signal transmitted to the monitoring station 12 from a receiver attachment includes a large 60 cycle component indicating that the receiver with which the attachment is associated is tuned for program signal reception from a transmitter operating in a band other than the broadcast band.

The all-other-programs switch 61 is of the well known minor type conventionally employed in signaling circuits of the character under consideration. In brief, this switch comprises a single set of contacts 61a, a wiper 61b, and an operating magnet 61c operative in conjunction with an associated ratchet and pawl mechanism, not shown, to drive the wiper 61b over the contacts of the bank 61a, a release magnet 61d which when energized permits the spring biased wiper 61b automatically to restore to normal, and a set of off-normal springs 61e. Energization of the release magnet 61d is under the control of a slow-to-release relay 62 which, in turn, is arranged for energization under the selective control of the program sequence switch 48.

The program sequence switch 48 is of the well known ten point rotary type conventionally employed in telephone and related signaling circuits. In brief, this switch comprises four sets of contacts 48a, 48b, 48c and 48d, each of ten points; wipers 48e, 48f, 48g, 48h individually associated with the four contact sets; and an operating magnet 48k which is operative to drive the enumerated wipers step-by-step over the contacts of their respective associated contact sets. In order periodically to energize the operating magnet 48k of the program sequence switch 48, thereby to advance the wipers 48e, 48f, 48g and 48h on a step-by-step basis and thus sequentially connect the output terminals of the eight monitoring units 19, 20, etc., to the input terminals 52a of the modulator 52, a rotatable pulsing element 49 is provided which is adapted to be driven at a precisely constant speed by means of a synchronous motor and gear train unit 50. The motor provided in this unit is adapted to be energized from any suitable commercial current source of constant frequency indicated by the bracketed terminals 51.

As indicated above, the home sequence switch 42, so-called because it has the function of sequentially associating the monitored receivers 10, 10a, etc., of the collaborator homes with the input terminals 52b of the modulator 52, is also of the well known rotary type. Specifically, this switch comprises three sets of contacts 42a, 42b, and 42c; wipers 42d, 42e, and 42f individually associated with the enumerated contact sets; and an operating magnet 42g which is operative in conjunction with an associated ratchet and pawl mechanism, not shown, to drive the identified wipers step-by-step over the contacts of their respective associated contact sets. The first two contact sets 42a and 42b are utilized to terminate opposite sides of the signal channels 16, 17, 18, etc. Thus, the upper side of the channel 16 is terminated at the first contact in the contact set 42a whereas the lower side of this channel is terminated at the first contact of the contact set 42b. Similarly, the upper and lower sides of the second channel 17 are respectively terminated at the second contacts of the two contact sets 42a and 42b. Energizing of the operating magnet 42g is under the control of the program sequence switch 48. More specifically, the arrangement is such that the switch 42 is operated at the rate of one step for each operating cycle of the program sequence switch 48.

As pointed out above, comparison of the signals derived from the receiver attachments of the monitored receivers with the signals derived from the monitoring units is carried out on a phase and amplitude basis. It is for this reason that an adjustable phase shifter 24 is provided in each of the networks 19b, 20b, and 21b. The adjustable phase shifting network 44 is provided for the same reason, this network performing the function of establishing phase coincidence between the signals of unknown pattern derived from the monitored receivers and the signals of known pattern derived from the monitoring units. If desired or necessary, phase shifting networks individual to the signal channels connecting the collaborator homes with the monitoring station 12 may be employed in each of the channels 16, 17, 18, etc., ahead of the home sequence switch 42 in the monitoring station 12. To provide for matching of the signals derived from the receiver attachments of the monitored receivers with those produced by the monitoring units on an amplitude basis, a volume indicator 52d is connected across the input terminals 52b of the modulator 52 to supply an indication of the level of the program signal input to this modulator from the receiver attachments of monitored receivers. This level may, of course, be changed as required through suitable adjustment of the wiper 47 along the potentiometer resistor 46. Similarly, the output terminals of the monitoring receivers 19, 20, 21, 22, etc., are respecitvely bridged by volume indicators 19c, 20c, 21c, 22c, etc., for the purpose of indicating the signal output levels of these receivers. The volume control devices of these receivers may be adjusted as desired to establish the required signal output levels. Also, the level of the signal input to the mixer tube 25 from the phase shifter 24 of each monitoring unit may be varied as required by adjustment of the potentiometer 24a. Finally, the signal input level from each monitoring unit to the modulator 52 may be varied as required by suitable adjustment of the potentiometer 19e of the unit.

For the purpose of producing record indications of the particular programs received and reproduced at the monitored receivers 10, etc., in the respective collaborator homes and the additional record information described more fully below, the recording apparatus illustrated in Fig. 3 of the drawings is provided. This apparatus comprises a strip recorder 27 which may be of any desired commercial type, such, for example, as that described and illustrated in United States Letters Patent No. 2,132,808, granted October 11, 1938, to Arthur T. Sigo. In brief, this recorder comprises a paper record strip 64 movable between supply and take-up spools, not shown, and driven at constant speed by sprocket driving facilities, not shown, engageable with the edge perforations in the strip. Constant speed rotation of the driving sprockets may be obtained by employing a conventional synchronous motor and gear train unit, the synchronous motor of which is adapted for energization from any commercial source of alternating current of constant frequency. Multi-trace recording on the strip 64 is obtained by providing a plurality of scribing pens 65 to 71, inclusive, and 76 to 78, inclusive, each of which is normally spring biased to a neutral position. In order to operate these pens on an individual basis to positions wherein they inscribe off-trace lines upon the record tape 64, pen magnets 65a to 71a, inclusive and 76a and 78a, inclusive, are provided in individual association with the described recording pens. In the illustrated arrangement, eight pens 69, 70, 71, etc., and 76 are provided which individually correspond to the eight wave signal transmitters A, B, C, etc., and H which are individually monitored by the monitoring units 19, 20, 21, etc. These pens are respectively and individually controlled through the first to eighth contacts of the contact set 48b embodied in the program sequence switch 48. The pen 77 is arbitrarily designated as an all-other programs pen for the reason that it is controlled through the ninth contact of the contact set 48c in the program sequence switch 48 and the first contact of the switch 61 to produce record indications of the fact that one or more of the monitored receivers is in use but is not receiving a program from one of the eight monitored wave signal transmitters. Similarly, the pen 78 is arbitrarily designated as a "receiver-off" pen for the reason that it is controlled through the contacts of the signal-on relay 57 to produce record indications identifying non-use periods of the monitored receivers. The first four pens, 65 through 68 are provided to produce record indications of the particular collaborator receivers which are sequentially associated with the above-described comparing equipment under the control of the home sequence switch 42.

In order to reduce the number of pens in the pen recorder 27 required to identify on an individual basis the ten monitored receivers which are selectively and sequentially associated with the signal comparing equipment, the ten slow-to-operate coding relays 80, 90, 100, 110, 120, 130, 140, 150, 160 and 170 are provided directly to control the four pens 65 to 68, inclusive. These relays have their operating windings respectively wired to the ten contacts of the contact set 42c embodied in the home sequence switch 42 through the cable 86. Specifically, the operating winding of the relay 80 is wired directly to the upper or first contact of the contact set 42c, the operating winding of the second coding relay 90 is wired directly to the second contact of the contact set 42c, and so on. With this arrangement and as pointed out more fully below, a particular one of the ten coding relays is operated at each home selecting position of the sequence switch 42. Energizing current for the described relays, pen magnets and switch magnets is supplied from a suitable direct current source, not shown, having its positive terminal connected to a grounded bus conductor and its negative terminal connected to each illustrated winding terminal identified by the negative polarity symbol.

In considering the operation of the system, it will be understood that the ten monitored receivers 10, etc., respectively located in the different system collaborator homes are each susceptible to periods of use and non-use. Further, each receiver is tunable to receive program signals from any one of several different wave signal transmitters operating in each of two or more frequency bands including the broadcast band. In the particular area served by the described system, the monitoring receivers 19a, 20a, 21a, etc., provided at the monitoring station 12 are respectively tuned continuously to monitor the eight wave signal transmitters A, B, C-H, the program signals of which are most frequently received by the wave signal receivers located in this particular area. The purpose of the system is to provide on an accurately controlled chronology basis, a continuous record giving the following information in respect to each of the ten monitored receivers 10, etc., under observation.

1. The periods of use and non-use of each monitored receiver.

2. The particular wave signal transmitters operating at frequencies in the broadcast band to which each monitored receiver is tuned during each use period. This information permits the particular programs listened to in each collaborator home to be readily determined in interpreting or decoding the records.

3. Each period of time during which any one of the monitored receivers is tuned to receive program signals originating at transmitters operating at frequencies in the broadcast band other than the eight monitored transmitters.

4. Each period of time during which any one of the monitored receivers is tuned to receive program signals from transmitters operating at frequencies in bands other than the broadcast band.

In addition, the system is so arranged that each record indication representative of any one of the above items of information is correlated with a separated record indication which positively identifies the particular monitored receiver to which the item of recorded information pertains. To accomplish the above ends, the record tape 64 in the recorder 27 is continuously operated except for those periods when the system operation is interrupted for the purpose of changing record tapes. In effecting such a tape change, the exact instant of stopping the tape movement is recorded on the tape and when a new tape is installed in the recorder, the exact instant of starting the tape movement is likewise recorded on the tape. It will thus be apparent that the factor "time" is measured in terms of tape length and that the occurrence of the event resulting in production of any specific record mark may accurately be determined by ascertaining the position of the record mark longitudinally of the tape. The other monitoring station equipment illustrated in Figs. 2 and 3 of the drawings is continuously operated.

Referring now more particularly to the specific mode of operation of the system, it will be understood that with the synchronous motor and gear train unit 50 in continuous operation, a circuit is periodically completed by the pulsing element 49 for energizing the operating magnet 48k of the program sequence switch 48. Each time this magnet is energized, it functions in cooperation with its associated ratchet and pawl mechanism to advance the wipers 48e, 48f, 48g and 48h one step. Thus, as the magnet 48k is periodically energized, these wipers are driven in a counter-clockwise direction sequentially to engage the different contacts of their respective associated contact sets. As a result, the output terminals of the eight monitoring units 19, 20, 21, etc., are successively connected to the input terminals 52a of the modulator 52.

Each time the wiper 48h of the program sequence switch 48 is operated to engage its associated tenth contact, an obvious circuit is completed for energizing the stepping magnet 42g of the home sequence switch 42. When thus energized, the magnet 42g functions to advance the wipers 42d, 42e and 42f one step in a counter-clockwise direction. Thus, the wipers of the home sequence switch 42 are advanced at the rate of one step for each operating cycle of the program sequence switch 48. This means that during each interval when the home sequence switch 42 is positioned to deliver signals from any one of the monitored receivers to the input terminals 52b of the modulator 52, the ouput terminals of all eight of the monitoring units 19, 20, 21, etc., are successively connected to the input terminals 52a of the modulator before the home sequence switch 42 is advanced. It further means that the signal transmission channels extending to the receivers provided in the ten different collaborator homes are successively connected to the modulator input terminals 52b. As this occurs, the coding relays illustrated in the upper portion of Fig. 3 of the drawings are selectively controlled to produce coded record indications specifically identifying the different receivers. Thus with the wipers of the switch 42 in engagement with their respective associated first contacts, such that the signal channel extending to the receiver 10 is connected to the modulator input terminals 52b, a circuit is completed through the wiper 42f and its engaged first contact for energizing the relay 80. With this relay energized, an obvious circuit is completed at the contacts 81 for energizing the magnet 65a. With this magnet energized, the pen 65 is deflected to inscribe an off-trace line upon the record tape 64. Similarly, when the switch 42 is advanced to bring the wipers thereof into engagement with their respective associated second contacts and thus operatively associate the monitored receiver in collaborator home No. 2 with the modulator input terminals 52b, a circuit is completed through the wiper 42f and its engaged second contact for energizing the relay 90. With this relay operated, a circuit through the contacts 91 is completed for energizing the pen magnet 66a to cause deflection of the pen 66 and thus produce an off-trace line upon the record tape 64. The relays 100 and 110 similarly control directly and respectively the magnets 67a and 68a to cause the production of off-trace lines on the record tape 64 when the sequence switch 42 is operated to associate the third and fourth monitored receivers with the modulator 52. The remaining six coding relays are respectively operated only when the wipers of the sequence switch 42 engage the fifth to tenth contact of their respective associated contact sets to associate corresponding ones of the monitored receivers with the modulator 52. These relays in operating, serve to energize the pen magnets 65a, 66a, 67a and 68a in coded combinations to produce corresponding coded combinations of off-trace lines on the record tape 64 which identify the various receivers. Specifically, this coding is accomplished in accordance with the following code pattern as will be evident from a study of the circuits controlled by the relays 120, 130, 140, 150, 160 and 170 and a study of the off-trace lines produced on the record strip in the manner shown in Fig. 4 of the drawings.

| Position of Switch 42 | Home Associated With— | Coding Relay Operated | Coding Relay Contacts Closed | Recording Pens Deflected |
| --- | --- | --- | --- | --- |
| First | No. 1 | 80 | 81 | 65 |
| Second | No. 2 | 90 | 91 | 66 |
| Third | No. 3 | 100 | 101 | 67 |
| Fourth | No. 4 | 110 | 111 | 68 |
| Fifth | No. 5 | 120 | 121 and 122 | 65 and 66 |
| Sixth | No. 6 | 130 | 131 and 132 | 65 and 67 |
| Seventh | No. 7 | 140 | 141 and 142 | 65 and 68 |
| Eighth | No. 8 | 150 | 151 and 152 | 66 and 67 |
| Ninth | No. 9 | 160 | 161 and 162 | 66 and 68 |
| Tenth | No. 10 | 170 | 171 and 172 | 67 and 68 |

From a consideration of this table and Fig. 4 of the drawings, it will be readily apparent that different pens or combinations of pens are operated to produce distinctive off-trace record lines respectively identifying the particular periods when the different monitored receivers are operatively associated with the comparing equipment shown in Fig. 2 of the drawings.

Briefly to consider the manner in which the comparing operations are effected, it may be assumed that during a particular period of use the monitored receiver 10 is tuned to receive program signals originating at the particular transmitter A which is being monitored by the receiver 19a of the monitoring unit 19. During this use period and each time the sequence switch 42 is operated to connect the signal channel 16 to the input terminals of the amplifier 43, the composite signal developed across the output terminals of the receiver attachment 32 as transmitted to the monitoring station 12 over the connected signal channels 13 and 16 is impressed through the wipers 42d and 42e of the switch 42 upon the input terminals of the amplifier 43. Following amplification in this amplifier, the composite signal is impressed across the input terminals of the control and rectifier tube unit 45 to effect energization of the signal-on relay 57 in a manner clearly apparent from the above explanation. Specifically, the relay 57 is held operated so long as signal voltages are impressed across the input terminals of the amplifier 43. With this relay operated, a circuit is prepared at the contacts 58 for selectively energizing the magnets 69a to 76a, inclusive, respectively corresponding to the wave signal transmitters A, B, C, etc., being monitored by the monitoring receivers 19a, 20a, 21a, etc. At the contacts 59, a circuit is also prepared for energizing the operating magnet of the all-other programs pen 77. At the contact 60, the operating circuit for the magnet 78a of the receiver-off pen 78 is held open.

The composite signal developed by the receiver attachment 32 and reproduced in amplified form at the output side of the amplifier 43 is also delivered with a time delay through the phase shifting network 44 to appear across the potentiometer resistor 46. Depending upon the setting of the wiper 47, a variable portion of the composite signal voltage appearing across the resistor 46 is impressed across the input terminals 52b of the modulator 52.

Before proceeding further with the explanation, it is pointed out that each program, regardless of the character thereof, i. e., whether a newscast, a symphony orchestra or a dance band, is characterized by an audio signal pattern of unique distinctiveness, instant by instant. In other words, the methematical possibility of two different programs having the same audio frequency signal pattern is nil for all practical purposes. The purpose of the modulator 52 is to compare the pattern of the signal voltage impressed upon its input terminals 52b from the receiver attachment 32 of the receiver 10 (in the case under consideration) successively with the signal patterns of the signals developed at the output terminals of the eight monitoring units and to indicate a condition of match or non-match as the case may be. Specifically, when the wipers of the program sequence switch 48 are positioned to engage their respective associated first contacts, the composite signal appearing at the output side of the monitoring unit 19 is impressed upon the input terminals 52a of the modulator 52. Since this signal has a pattern matching the pattern of the signal appearing across the modulator input terminals 52b, this modulator indicates the match by producing a voltage across its output terminals 52c having the effect of sufficiently reducing the bias between the input electrodes of the control tube 53 to effect operation of the signal match relay 54. In operating, this relay closes its contacts 58 and complete a circuit through the contacts 58 and the wiper 48f and its engaged first contact for energizing the operating magnet 69a of the pen 69. When thus energized, the magnet 69a deflects the pen 69 to produce an off-trace line on the record tape 64. This line, by virtue of its transverse position across the tape 64, positively identifies the transmitter A as the particular transmitter from which program signals are being received. Further, since the off-trace line is opposite a segment of the off-trace line being traced by the pen 65, the monitored receiver 10 is identified as the receiver at which the program signals are received. Inscription of the off-trace mark by the pen 69 continues until the wipers of the switch 48 are stepped to engage their associated second contacts under the control of the pulsing element 49. With the wipers of this switch engaging their associated second contacts, non-matching program signals are delivered from the monitoring unit 20 to the input terminals 52a of the modulator 52. Accordingly, the voltage at the output terminals 52c of this modulator is reduced to effect a decrease in the current flow through the signal match relay 54 which causes this relay to release. Upon restoring, the relay 54 opens its contacts 55 to deenergize the pen magnet 69a and thus permit the pen 69 to return to its normal position. In a similar manner, non-matching program signals are delivered to the input terminals 52a of the modulator 52 from the third to eighth monitoring receivers 21–26 as the wipers of the program sequence switch 48 are successively advanced to engage their respective associated third to eighth contacts under the control of the pulsing element 49.

If at the time the described operating cycle of the program sequence switch 48 is in progress the transmitter A is broadcasting the same program as the transmitter D, which is being monitored by the receiver 22a of the monitoring unit 22, for example, the signal produced across the output terminals of the monitoring unit 22 is the same as that developed across the output terminals of the receiver attachment 32 and hence applied to the input terminals 52b of the modulator 52 except for the 3500 cycle component of the composite signal developed by the receiver attachment 32. Accordingly, when the program sequence switch 48 is advanced to connect the modulator input terminals 52a with the output terminals of the monitoring unit 22, the only distinguishing characteristic of the two signals respectively impressed upon the two sets of input terminals of the modulator 52 is the 3500 cycle component of the composite signal impressed upon the input terminals 52b. This component of the composite signal sufficiently distinguishes this signal from the pure program signal impressed upon the input terminals 52a to prevent the modulator 52 from indicating a match between the two signals being compared. Accordingly, the signal match relay 54 is prevented from operating. It will thus be understood that only one off-trace mark is produced on the record strip 64 during the operating cycle of the switch 48 in progress, and this mark is produced by the pen 69 to indicate that the receiver 10 was tuned to receive program signals from the transmitter A during the particular time period in which the described operating cycle of the sequence switch 48 occurred.

Another operation effected in response to operation of the signal match relay 54 as a result of matching of the received composite signal from the receiver attachment 32 with the composite signal developed by the monitoring unit 19, is that of advancing the wiper 61b of the all-other programs switch 61 to prevent operation of the all-other programs pen 77 during the concluding part of the operating cycle of the switch 48. Specifically, the signal match relay 54, upon closing its contacts 56 at any point in the first part of each operating cycle during which the signals received from the receiver attachments of the monitored receivers are compared with the signals delivered by the eight monitoring units, energizes the operating magnet 61c over an obvious circuit. Thereafter, and when the relay 54 is deenergized in response to stepping of the switch 48 to a non-signal match position, the contacts 56 are opened to deenergize the magnet 61c, permitting the spring biased operating mechanism of this switch to advance the wiper 61b from its first home position into engagement with its associated second contact. As a consequence, the operating circuit for the magnet 77a is opened at the wiper 61b before the wiper 48g of the sequence switch 48 is advanced to engage its associated ninth contact. Hence, the pen 76 is prevented from operating to produce an off-trace indication on the record strip 64 that the monitored receiver 10 was tuned to receive program signals from a transmitter other than the eight monitored transmitters. When the wiper 61b is thus stepped off-normal, the off-normal springs 61e are closed to prepare the operating circuit for the slow-to-release relay 62.

Thereafter and when the wipers of the switch 48 are advanced to engage their associated tenth contacts, a circuit is completed at the wiper 48h for energizing the release relay 62 in parallel with the operating magnet 42g of the home sequence switch 42. In operating, the relay 62 closes its contacts 63 to energize the magnet 61d and thus effect restoration of the switch wiper 61b back to its normal or home position. Incident to release of the switch 61, the off-normal springs 61e are opened to deenergize the release relay 62. The latter relay in falling back opens its contact 63 to deenergize the magnet 61d. Thus, the all-other programs switch 61 is restored to normal to reprepare the operating circuit for the pen magnet 77a.

When the operating magnet 42g is energized in the manner just explained, it functions to advance the wipers of the home sequence switch 42 into engagement with their respective associated second contacts, thereby to effect deenergization of the coding relay 80, energization of the second coding relay 90, and connection of the signal channel extending to the receiver attachment of the monitored receiver collaborator home No. 2 to the input terminals of the audio amplifier 43. In this regard, it is pointed out that the wipers 42d, 42e and 42f of the sequence switch 42 are of the non-bridging type such that signal voltage input to the amplifier 43 is momentarily interrupted during intercontact movement of these wipers. However, the signal-on relay 57 is of the well known slow-to-release type such that it does not fall back or release during intercontact movement of the home sequence switch wipers. Moreover, by using non-bridging wipers in this switch, overlapping operation of the coding relays 80, 90, etc., is positively prevented. Further to this end, these relays are designed to have slow-to-operate characteristics, thereby to insure the release of any operated one thereof shortly prior to operation of another thereof.

After the receiver attachment of the receiver in collaborator home No. 2 is operatively associated with the described comparing equipment in the monitoring station 12, the program sequence switch 48 operates through another cycle in the exact manner explained above. In this regard, it will be understood that the operating magnet 42g of the home sequence switch 42 is deenergized when the double ended wipers of the sequence switch 48 are advanced out of engagement with their respective associated tenth contacts and back into engagement with their respective associated first contacts. Assuming that the receiver in collaborator home No. 2 is tuned for the reception of program signals from the transmitter B, which is monitored at the monitoring station 12 by the monitoring receiver 20a of the monitoring unit 20, the signal match relay 54 is operated in a manner fully apparent from the above explanation during the short interval when the wipers of the sequence switch 48 remain in engagement with their respective associated second contacts. In this case, the relay 54, in closing its contacts 55, completes an obvious circuit for energizing the magnet 70a of the pen 70 which individually corresponds to the transmitter B. Thus, the pen 70 is actuated to inscribe an off-trace line on the record strip 64 opposite the off-trace line being inscribed by the pen 66, thereby to provide an indication that during the particular time interval spanned by the particular operating cycle of the switch 48 in progress, the receiver in collaborator home No. 2 is tuned for the reception of program signals from the transmitter B. Here again, the pen 70 is the only one of the transmitter identification pens which is operated during the particular operating cycle of the sequence switch 48 in progress. Thus the signal match relay 54, upon operating, again closes its contacts 56 to energize the magnet 61c and thus effect operation of the wiper 61b to its first off-normal position, thereby to prevent energization of the magnet 77a during the concluding part of the operating cycle of the switch 48. The switch 61 is restored to normal and the home sequence switch is advanced another step during the concluding part of the operating cycle of the program sequence switch 48 under consideration, all in the exact manner explained above.

From the foregoing explanation, it will be understood that as the home sequence switch 42 operates successively to associate the receiver attachments of the monitored receivers in the third to tenth collaborator homes with the comparing equipment provided in the monitoring station 12, the pens of the recorder 27 are selectively controlled to produce record indications identifying the particular wave signal transmitters to which the respective monitored receivers are tuned for the reception of program signals. It will further be understood that after the monitored receivers of all ten of the collaborator receivers have been tested, the home sequence switch 42 starts a second operating cycle to repeat the testing operation. In fact, this switch continues to operate on a cyclic basis, such that a continuous record is formed on the record strip 64 positively identifying any and all changes in the manner of use or operation of each of the ten collaborator receivers.

As pointed out above, it may not infrequently occur that one of the ten collaborator receivers will be tuned for the reception of program signals from a transmitter other than the eight transmitters being monitored. To assume an exemplary case, the receiver provided at collaborator home No. 2 may during a given operating cycle of the home sequence switch 42 and a given operating cycle of the program sequence switch 48 be tuned for the reception of program signals from a distantly located transmitter not ordinarily received by the receivers of the collaborator homes in the area in which the system is used. In such case, the signal match relay 54 is not operated during the initial portion of the operating cycle of the sequence switch 48 for the reason that the program signals impressed upon the modulator input terminals 52b from the receiver attachment of the receiver in collaborator home No. 2 do not match the program signals impressed upon the modulator input terminals 52a from any one of the eight monitoring units 19, 20, etc. Accordingly, the wiper 61b of the all-other programs switch 61 remains in its home position throughout the initial portion of the operating cycle of the sequence switch 48. When the wipers of the switch 48 are operated to engage their respective associated ninth contacts, however, a circuit is completed from ground at the contacts 59 of the operated signal-on relay 57 through the contacts 85, the wiper 61b and the wiper 48g for energizing the magnet 77a of the pen 77. Accordingly, the pen 77 is deflected to produce an off-trace mark indicating that the receiver in collaborator home No. 2 is tuned for the reception of program signals from a non-monitored transmitter. Inscription of this off-trace mark only persists during the short interval when the wiper 48g of the switch 48 is standing in engagement with its associated ninth contact. Moreover, when the wiper 48h is stepped to engage its associated tenth contact, the release relay 62 is not energized due to the fact that the wiper 61b has not been stepped off normal to effect closure of the off-normal springs 61e. Thus, facilities are provided in the system for producing record indications of those periods during which any one of the ten collaborator receivers is tuned for the reception of programs from non-monitored transmitters.

As indicated above, it may occur that one of the ten collaborator receivers will be tuned for reception of program signals from a transmitter operating at a frequency in a band other than the broadcast band. To assume a particular case, the receiver 10 provided at the collaborator home No. 1 may during a given operating cycle of the home sequence switch 42 and a given operating cycle of the program sequence switch 48 be tuned for the reception of program signals from a transmitter operating at a frequency in the short wave band. In such case, the signal match relay 54 is not operated during the initial portion of the operating cycle of the sequence switch 48 for the reason that the signal impressed upon the modulator terminals 52b from the receiver attachment 32, does not match the composite signal impressed upon the modulator input terminals 52a from any one of the eight monitoring units 19, 20, etc. More specifically, the large 60 cycle ripple component of the signal impressed upon the modulator input terminals 52b from the receiver attachment 32 positively precludes this composite signal from matching that impressed upon the input terminals 52a from the monitoring unit 19, and hence prevents the signal match relay 54 from operating when the wipers of the sequence switch 48 are positioned to engage their respective associated first contacts. Thus, the signal match relay 54 is prevented from operating to effect off-normal operation of the all-other-programs switch 61.

In the case under consideration, the 60 cycle ripple component of the composite signal appearing across the output terminals of the amplifier 43 is selectively passed by the band pass filter 82 to produce a response of the rectifier and control tube unit 83 which results in operation of the band switch relay 84. This relay remains operated throughout the operating cycle of the program sequence switch 48 under consideration. With this relay operated, the operating circuit for the magnet 77a of the all-other-programs pen 77 is held open at the contacts 85. Thus this pen is not deflected to its off-trace setting in response to operation of the sequence switch 48 to bring the wipers of this switch into engagement with their respective associated eighth contacts. It will be understood, therefore, that receiver listening in bands other than the broadcast band is identified by the absence of off-trace indications of the all-other-programs pen 77 while the other pens of the recorder 27 indicate that the receiver 10 is turned on for signal reception. It will also be understood that when the home sequence switch 42 is advanced to disassociate the receiver attachment 32 from the equipment provided at the monitoring station, transmission of the 60 cycle ripple component by the band pass filter 82 is interrupted to effect the release of the band switch relay 84. Thus the equipment at the monitoring station 12 is conditioned to effect recordation of program signal reproduction by the receiver in collaborator home No. 2.

The system is also provided with facilities for recording non-use periods of the respective monitored receivers. Thus, the signal-on relay 57 is held operated under the control of the rectifier and control tube unit 45 only so long as signals are delivered to the input side of the audio frequency amplifier 43. This means that if the home sequence switch 42 is advanced to associate the receiver attachment of the receiver in collaborator home No. 10, for example, with the comparing equipment provided at the monitoring station 12 during a period when this receiver is not in use, the signal-on relay 57 is deenergized and restores. In releasing, this relay opens its contacts 58 to interrupt a common point in the operating circuits for the transmitter identification pen magnets 69a to 76a, inclusive. At its contacts 59, the relay 57 opens a point in the operating circuit for the pen magnet 77a of the all-other programs pen 77. At its contacts 60, the relay 57 closes an obvious circuit for energizing the magnet 78a of the receiver-off pen 78. Thus, the pen 78 is deflected to inscribe an off-trace line upon the record strip 64. Inscription of this off-trace line persists throughout the entire interval when the receiver attachment of the receiver at collaborator home No. 10 is operatively associated with the comparing equipment at the central station 12. In other words, it is co-extensive in length with the off-trace segments being inscribed upon the record tape 64 by the pens 67 and 68 to identify the receiver at collaborator home No. 10 as that being tested. When, however, the home sequence switch 42 is advanced to re-associate the receiver 10 with the comparing equipment at the monitoring station, the signal-on relay 57 is re-operated, assuming that this receiver is in use. Upon reoperating, the relay 57 closes its contacts 58 and 59 to reprepare the operating circuits for the pen magnets 69a to 77a, inclusive, and opens its contacts 60 to deenergize the pen magnet 78a. Thus, the pen 78 is restored to its neutral position to end the off-trace segment being inscribed thereby upon the record strip 64.

From the preceding explanation, it will be understood that the periodicity or rate at which the monitored receivers at the ten collaborator homes are successively tested depends upon the stepping speed of the program sequence switch 48 and hence the speed at which the pulsing cam 49 is operated. These speeds may be as rapid as desired within the capabilities of the switch 48. However, sufficient time must be allotted to each comparing operation to permit an accurate response of the signal match relay, the pen magnets and the all-other programs switch 61. Assuming that a three second interval is found to be adequate for program signal comparison and response of the recording pens, the speed of operation of the pulsing element 49 is set to produce a complete operating cycle of the program sequence switch 48 in 30 seconds. This necessarily means that a complete operating cycle of the home sequence switch 42 is produced in 5 minutes. With these speed constants, testing of the monitored receivers in the collaborator homes proceeds on a 5 minutes of listening time basis.

The character of a typical record formed upon a segment of the record strip 64 during a short period of operation of the system is well illustrated in Fig. 4 of the drawing. This record strip segment has been greatly exaggerated longitudinally of the strip in order to facilitate consideration of the off-trace record marks produced thereon and is assumed to cover a period of listening time extending from 5:00 p. m. to 5:07 p. m. on Tuesday, March 5, 1946. The significance of this record segment will be readily apparent when considered with the following table.

| Off-Trace Mark | Home at which Program Received | Transmitter Radiating Received Program |
|---|---|---|
| 1A | No. 1 | A. |
| 2B | No. 2 | B. |
| 3B1 | No. 3 | B. |
| 4D | No. 4 | D. |
| 5H | No. 5 | H. |
| 6A | No. 6 | A. |
| 7B | No. 7 | B. |
| 8B | No. 8 | B. |
| 9A | No. 9 | A. |
| 10D | No. 10 | D. |
| 1A0 | No. 1 | (1) |
| 2R0 | No. 2 | None. |
| 3B2 | No. 3 | B. |
| 4B | No. 4 | B. |
| 5C | No. 5 | C. |

[1] Non-monitored transmitter.

From an inspection of the illustrated record segment and the table interpretation thereof, it will be understood that at 5:00 p. m. of the calendar period in question, the receiver 10 at collaborator home No. 1 was tuned for the reception of program signals from the transmitter A and that within five minutes thereof, the receiver was returned for the reception of program signals for a non-monitored transmitter. It will also be apparent that throughout the period in question, the receiver provided at collaborator home No. 3 remained tuned for the reception of program signals from the monitored transmitter B. Further, the receiver provided at collaborator home No. 2, which at 5:00 p. m. was tuned for the reception of program signals from the transmitter B, was turned on prior to 5:06 p. m. The other record indications respectively provided by the identified off-trace marks will be readily apparent from inspection of the record segment shown in Fig. 4 of the drawings when taken in connection with the foregoing table.

As pointed out in the introductory portion of the specification, combination television, AM and FM receivers are now commercially available which are capable of receiving the same audio program from either a television transmitter or an AM or FM transmitter. However, the system arrangement illustrated in Figs. 1, 2 and 3 of the drawings and described above is incapable of discriminating between reception of a particular audio program from a television transmitter and reception of the same program from an AM or FM transmitter. In order to provide for such discrimination, the system shown in Figs. 1, 2 and 3 may be modified in the manner shown in Figs. 6 and 7. Referring to the two last-mentioned figures of the drawings, the monitored receiver 210 is schematically illustrated as being a combination AM, FM and television receiver, including a video section 208 and a cathode ray tube 209, in addition to the radio frequency and audio frequency sections 228 and 229. Reference characters of the 200 series, but having the same tens and units digits and the same letter subscripts, have been used in Fig. 6 of the drawings to identify those circuit components of the receiver attachment 232 which correspond to like components of the receiver attachment 32. As shown, the receiver 210 is equipped for program signal reception from transmitters operating at frequencies in at least three frequency bands, including the broadcast or AM band, the FM band and the television band. Accordingly, the radio frequency section of the receiver is shown as including a three position band switch 228b. This switch is mechanically connected to actuate a three position switch 240 having a wiper 240a for connecting the large filter condenser 237c in shunt with the small filter condenser 237b only when the switch 228b is adjusted to condition the receiver 210 for reception of program signals originating at transmitting stations operating at frequencies in the broadcast band. This switch further comprises two additional wipers 240b and 240c which are arranged selectively to include current sources of different frequencies in the circuit for supplying anode potential to the mixer tube 234. More specifically, the arrangement is such that when the band switch 228b is operated to condition the receiver 210 for program signal reception from AM or FM transmitters, the switch wipers 240b and 240c are respectively operated to their middle and lower settings to include the 60 cycle current source 237d in the anode current supply circuit for the mixer tube 234. On the other hand, when the band switch 228b is operated to condition the receiver 210 for program signal reception from television transmitters, the switch wipers 240b and 240c are operated to their respective upper positions to include the 120 cycle current source 237e in the anode current supply circuit for the mixer tube 234. This current source may conveniently comprise a frequency doubler having its input terminals connected to the 60 cycle current supply source. Aside from the described modification of the switch 240, the receiver attachment 232 as shown in Fig. 6 of the drawings is identical with that shown in Fig. 1 of the drawings and operates in precisely the same manner.

From the above description with reference to the modified arrangement of the receiver attachment 232 as shown in Fig. 6 of the drawings, it will be understood that so long as the receiver 210 is conditioned for signal reception from an AM transmitter the large filter condenser 237c is connected in shunt with the small filter condenser 237b, such that composite signals identical with those produced by the receiver attachment 232 shown in Fig. 1 of the drawings are produced across the output terminals of the amplifier 236 in response to tuning of the receiver over the AM or broadcast band. It will also be understood that when the band switch 228b is operated to condition the receiver 210 for reception from an FM transmitter band, the switch 240 is operated to disconnect the filter condenser 237c from across the condenser 237b, with the result that a relatively large 60 cycle ripple component is introduced into the composite signal developed across the output terminals of the amplifier 236. Finally, when the switch 228b is operated to condition the receiver 210 for program signal reception from a television transmitter, the switch 240 is operated to disconnect the filter condenser 237c from across the small filter condenser 237b. Concurrently, the switch wipers 240b and 240c are operated to include the 120 cycle source 237e in the power supply circuit for the mixer tube 234 in lieu of the 60 cycle current source 37d. As a consequence, a relatively large 120 cycle ripple component is introduced into the composite signal developed across the output terminals of the amplifier 236. Thus, AM, FM and television reception by the receiver 210 are positively distinguished in developing the output signals of the receiver attachment 232.

The equipment provided at the monitoring station 12 as shown in Figs. 2 and 3 responds to the composite signal representative of AM and FM transmitter reception at the receiver 210 as shown in Fig. 6 in the exact manner explained above. In order to identify the 120 cycle ripple modulated composite signal which is received from the receiver attachment 232 when the receiver 210 is conditioned for signal reception from a television transmitter, it is necessary to provide one or more additional monitoring units at the monitoring station. These units may be of the character shown in Fig. 7 of the drawings and the output terminals thereof may be respectively connected to different contacts of the contact set 48a included in the program sequence switch 48. In general, the monitoring unit 219 as shown in Fig. 7 is similar to the monitoring unit 19 shown in Fig. 2. Accordingly, reference characters of the 200 series but having the same tens and units digits and the same letter subscripts have been employed in Fig. 7 to identify those components of the monitoring unit 219 which correspond to like components of the monitoring unit 19. From a comparison of these two units, it will be noted that they are identical except for the manner in which anode potential is supplied to the mixer tube 225. The monitoring receiver 219a is a television receiver continuously tuned to monitor one of the television transmitters capable of being received by the receiver 210 and the grid 225c of the mixer tube 225 is coupled to the audio output terminals of the receiver. The unit 219 includes an anode current supply circuit which comprises a 120 cycle current source 241, a phase shifter 242, a diode rectifier tube 244, a rectifier load resistor 243 and a small filter condenser 245 connected in shunt with the resistor 243. This circuit functions to excite the connected anodes of the tube 225 with a positive potential characterized by a strong 120 cycle ripple component. This ripple component is mixed with the signals respectively impressed upon the two grids of the tube 225 from the monitoring receiver 219a and the phase shifter 224 to produce a composite signal across the output terminals of the unit 219 having the same frequency pattern and phase relationship between the mixed signal components as the composite signal developed across the output terminals of the amplifier 236 when the receiver 210 is tuned for program signal reception from the television transmitter being monitored by the monitoring receiver 219a. Thus when the home sequence switch 42 is operated to connect the receiver attachment 232 of Fig. 6 with the comparing equipment provided at the monitoring station 12, a signal match may be established between the composite signal derived from this receiver attachment and the composite signal derived from the monitoring unit 219 when the program sequence switch 48 is operated to connect the output terminals of the monitoring unit 219 with the terminals 52a of the modulator 52. It will thus be apparent that when the system of Figs. 1, 2 and 3 is modified to include the facilities illustrated in Figs. 6 and 7 of the drawings, it is rendered capable of distinguishing between the reception of a given program from either a television transmitter or an AM or FM transmitter when the signals radiated by the two transmitters are capable of being received by the same monitored receiver.

In order to eliminate the monitoring units from the monitoring station 12 and to simplify somewhat the arrangement of the receiver attachments, the system equipment shown in Figs. 8 and 9 may be combined with the recording equipment shown in Fig. 3 in the manner indicated in Fig. 5. The system arrangement thus obtained is substantially similar to that of Figs. 1, 2 and 3, except that matching of program signals obtained directly from the monitoring units and the monitored receivers is not relied upon to obtain indications as to the transmitting stations to which the respective monitored receivers are tuned. In order to indicate the similarity between the two systems, corresponding reference characters have been used in Figs. 1, 2, 8 and 9 to identify like components. As will be seen, the receiver attachment 332 of Fig. 8 differs from that of Fig. 1 in that the step tuned resistance-capacitance oscillator 333 is directly coupled through a coupling transformer 335a to the input terminals of the amplifier 336 which feeds the transmitter identification signals to the wire channel 13 for transmission to the monitoring station 12. Transmitter identification is obtained with the receiver attachment 332 by controlling the oscillator 333 to have a discretely different output frequency for each particular transmitting station of interest received by the receiver 310. For example, if it is desired to obtain record indications of receiver listening to transmitters, A, B, C, D, E, F, G and H, eight different frequency determining resistors 339a, 339b, 339c–339h, individually corresponding to these transmitters, may be provided to control the output frequency of the oscillator 333. These resistors may have resistance values such that when respectively included in the frequency determining circuit of the oscillator 333 under the control of the multi-position rotary switch 338 the oscillator has output frequencies of 1500, 1900, 2300, 2700, 3100, 3500, 3900 and 4300 cycles, respectively. The switch 338 is also arranged selectively to include a common all-other programs resistor 339j in the frequency determining circuit of the oscillator 333 when the receiver 310 is tuned to receive program signals from any transmitter other than the transmitters A–H. This common resistor may have a resistance value such that when included in the frequency determining circuit of the oscillator 333, the oscillator has an output frequency of 1000 cycles. As in the Fig. 1 arrangement, the switch 338 is mechanically connected for actuation in response to operation of the tuning shaft of the monitored receiver 310. The switch 340 which is provided in the receiver attachment 332 to indicate program signal reception from transmitters operating in the short wave band, for example, is arranged for mechanical actuation with the band switch 328b of the receiver and is connected to switch any and all of the resistors 339a–339j out of the frequency determining circuit of the oscillator 333 and to switch into this circuit a resistor 339k which causes the oscillator 333 to develop an output signal having a frequency discretely different from the frequency of any transmitter identification signal. For example, inclusion of the resistor 339k in the frequency determining circuit of the receiver attachment 332 may cause the oscillator 333 to develop an output signal having a frequency of 5000 cycles.

With the described modified arrangement of the receiver attachment 332 shown in Fig. 8 of the drawings, it will be understood that when the monitored receiver 310 is respectively tuned to receive signals from the transmitters A, B, C, D, E, F, G and H, signals are respectively developed across the output terminals of the amplifier 336 having frequencies of 1500, 1900, 2300, 2700, 3100, 3500, 3900, and 4300 cycles. In any other tuning setting of the receiver 310, the switch 338 is adjusted to include the resistor 339j in the frequency determining circuit of the oscillator 333 thereby causing this oscillator to develop an all-other-programs signal having a frequency of 1000 cycles. When the band switch 328b of the receiver 310 is operated to condition the receiver for program signal reception from transmitters operating in the short wave band, the switch 340 is operated to exclude any connected resistor 339a–339j from the frequency determining circuit of the oscillator 333 and to include the resistor 339k in this circuit, such that a signal of 5000 cycles appears across the input terminals of the amplifier 336. Thus it will be apparent that so long as the receiver 310 is turned on, the receiver attachment 332 of Fig. 8 develops an output signal; that for reception from each of the eight particular transmitters of interest this signal has a unique frequency; that reception from all other stations is identified by changing the frequency of the signal to a fixed value of 1000 cycles; and that short wave listening is indicated by changing the frequency of the signal to 5000 cycles.

At the monitoring station 12, the equipment as shown in Fig. 9 is substantially similar to that shown in Fig. 2 except that the phase shift network 44 is dispensed with and a conventional mixer 352, band pass filter 354 and rectifier and control tube unit 353 are substituted for the components 52 and 53 of the Fig. 2 arrangement. Also, fixed frequency oscillators 319, 320, 321 and 322 are substituted in the Fig. 9 arrangement for the monitoring units 19, 20, 21 and 22 of the Fig. 2 arrangement. As shown, the input terminals 352a of the mixer 352 are arranged successively to be connected to the output terminals of the oscillators 319, 320, 321, 322, etc., through the wipers 48e and contacts 48a of the program sequence switch 48. The other set of input terminals 352b of the mixer 352 are coupled directly to the output terminals of the audio frequency amplifier 43. The output terminals 352c of the mixer are connected directly to the input terminals of the band pass filter 354 which is connected to feed its output signal to the rectifier and control tube unit 353. This unit is so arranged that when no signal voltage is impressed upon the input terminals thereof, the control tube section of the unit is biased to prevent operation of the signal match relay 54. When, however, a signal is passed by the filter 354, the rectifier section of the unit 353 reduces the bias of the control tube section sufficiently to effect operation of the relay 54. It will be understood that if program signal reception at the monitored receivers from eight different transmitters is to be logged, eight oscillators 319, 320, 321, 322, etc., having discretely different output frequencies are required. More specifically, the oscillator 319 may be provided to represent program signal reception by a monitored receiver from the transmitter A. In such case, it is designed to have an output frequency of 1600 cycles, i. e., one hundred cycles more than the output frequency of the receiver attachment 332 of Fig. 8 when the receiver 310 is tuned to receive program signals from the transmitter A. Similarly, if the oscillators 320, 321 and 322, respectively correspond to the transmitters B, C and H, they are designed to have output frequencies of 2000, 2400, and 4400 cycles, respectively. The band pass filter 354 is sharply tuned to pass signals having a frequency of 100 cycles only. The rectifier and control tube unit 45 is designed to respond to signals of any frequency, including the described limit frequencies of 1000 and 5000 cycles, such that the signal-on relay 57 is held operated so long as any signal is supplied to the amplifier 43 from the receiver attachment associated with any one of the monitored receivers. The band pass filter 82, on the other hand, is sharply tuned to pass only the all-other-programs signal of 5000 cycles, such that the band switch relay 84 is only operated when the receiver attachment 332 of Fig. 8, for example, is operating to produce a 5000 cycle signal indicating that the receiver 310 is conditioned for program signal reception from a short wave transmitter.

Aside from the manner in which the signal comparing operation is performed, the equipment shown in Fig. 9 of the drawings operates to control the recording equipment shown in Fig. 3 and sequentially to sample the signals developed by receiver attachments 332 of the character shown in Fig. 8 in the exact manner explained above with reference to Fig. 3. By way of explaining how the signal comparing operation is effected by the monitoring station equipment shown in Fig. 9, it may be assumed that the receiver attachment 332 is, during a given operating cycle of the home sequence switch 42, operating to produce an output signal of 1500 cycles indicating that the receiver 310 is tuned for program signal reception from the transmitter A. With this case in mind, it will be understood that when the home sequence switch 42 is operated to connect the channel 16 to the input terminals of the amplifier 43, the 1500 cycle signal voltage is amplified through this amplifier and impressed upon the input terminals 352b of the mixer 352. When thereafter, the program sequence switch 48 is operated to connect the output terminals of the oscillator 319 to the input terminals 352a of the mixer 352, the two mixer input signals of 1500 and 1600 cycles, respectively, are heterodyned to produce a 100 cycle difference frequency signal which is passed by the filter 354 to the rectifier and control tube unit 353. This unit responds to the applied signal by increasing the current flow through the control section thereof and the signal match relay 54 to effect operation of this relay. In operating, the signal match relay 54 effects operation of the pen 70 in the manner previously explained. Thus the operation of the monitored receiver 310 to receive program signals from the transmitter A is logged on the record tape 64.

As the program sequence switch 48 is progressively advanced to associate the oscillators 320, 321 and 322, etc., with the mixer 352, the signals derived from these oscillators are successively mixed with the 1500 cycle signal being applied to the input terminals 352b of the mixer 352, such that heterodyne signals of 500 cycles, 900 cycles— 2900 cycles are successively developed across the output terminals 352c of the mixer. These heterodyne signals are all rejected by the band pass filter 354 to prevent the signal match relay 54 from operating. Thus this relay is only operated when the oscillator 319 corresponding to the particular transmitter A to which the monitored receiver 310 is tuned for program signal reception is connected to the input terminals 352a of the mixer 352. It is believed that the manner in which listening at the monitored receiver 310 to program signals originating at transmitters other than the transmitter A is identified by the comparing apparatus provided at the monitoring station 12 as shown in Fig. 9 of the drawings will be readily apparent from the above explanation. In this regard it will be understood that in the event the program sequence switch 48 operates through a complete cycle without producing operation of the signal match relay 54 and with the band switch relay 84 occupying its released setting, an all-other-programs indication is logged on the record tape 64 of the recorder.

As indicated in the introductory portion of the specification, the present improved system as described above is particularly useful in determining the audience popularity or rating of particular programs transmitted from one or more wave signal transmitters. Generally speaking, the effectiveness of any particular program as an advertising media is directly related to the factors enumerated in the first part of this specification. It will also be apparent from the above explanation that accurate record information from which all of these factors may be ascertained is provided simply and rapidly by the present improved system. Moreover, accumulation of this information is accomplished while using extremely simple equipment at the receiver in each collaborator home and relatively simple equipment at each monitoring station. In employing the described facilities for the specific purpose mentioned, it is contemplated that a number of systems of the character described may be used in different metropolitan areas each served by monitoring station equipment of the character shown in Figs. 2 and 3 or Figs. 9 and 3 of the drawings. From the various monitoring stations, the record strips, as extracted on a periodic basis from the recorders 27, may be mailed to the home office of the statistical organization operating the system for conversion into statistically analyzable form through the use of appropriate decoding equipment.

While there have been described what are at present considered to be the preferred embodiments of the invention, it will be understood that various modifications may be made therein which are within the true spirt and scope of the invention as defined in the appended claims.

What is claimed as new and desired to be secured by Letters Patent of the United States is:

1. In a system for determining the audience response to programs broadcast from different wave signal transmitting stations, a monitoring wave signal receiver for receiving program signals from one transmitting station, a first signal generator having a predetermined output frequency, means responsive to signals derived respectively from said monitoring receiver and said generator for developing a first composite signal, a monitored wave signal receiver selectively tunable to receive program signals from a plurality of transmitting stations operating at different frequencies including said one transmitter, a second signal generator operating at said predetermined output frequency, means responsive to signals derived respectively from said monitored receiver and said second signal generator when said monitored receiver is receiving program signals from said one transmitting station for producing a second composite signal, and signal comparison means excited by said two composite signals for indicating that said monitored receiver is receiving program signals from said one transmitting station.

2. In a system for determining the audience response to programs broadcast from different wave signal transmitting stations, a monitoring wave signal receiver for receiving program signals from one transmitting station, a first signal generator having a predetermined output frequency, means responsive to signals derived respectively from said monitoring receiver and said generator for developing a first composite signal, a monitored wave signal receiver selectively tunable to receive program signals from a plurality of transmitting stations operating at different frequencies and including said one transmitter, a second signal generator operative to develop an output signal of said predetermined frequency, means responsive to the tuning of said monitored receiver to receive program signals from said one transmitting station for tuning said second signal generator to operate at said predetermined frequency, means responsive to a signal derived from said monitored receiver and said second signal generator when said monitored receiver is receiving porgram signals from said one transmitting station for producing a second composite signal having the same frequency composition as said first composite signal, and signal comparison means excited by said two composite signals for indicating that said monitored receiver is receiving program signals from said one transmitting station.

3. In a system for determining the audience response to programs broadcast from different wave signal transmitting stations, a monitored wave signal receiver tunable selectively to receive program signals from different transmitting stations operating at different frequencies, a monitoring station remote from said monitored receiver and including monitoring wave signal receiving means for receiving program signals from a plurality of said transmitting stations, means controlled in accordance with the tuning of said monitored receiver for transmitting to said monitoring station signals indicative of the transmitting stations to which said monitored receiver is selectively tuned for program signal reception, signal comparison means at said monitoring station responsive to the signals transmitted to said monitoring station from said monitored receiver and also responsive to the operation of said monitoring receiving means for producing indications from which may be determined the transmitting stations to which said monitored receiver is selectively tuned for program signal reception, and additional means responsive to the tuning of said monitored receiver for controlling said last-named means to distinguish between two transmitting stations from which the same program signals are concurrently broadcast, said additional means including apparatus at said monitored receiver for modifying the signal transmitted from said monitored receiver to said monitoring station in a predetermined manner only when said monitored receiver is tuned to receive program signals from one of said two transmitting stations.

4. In a system for determining the audience response to programs broadcast from different wave signal transmitting stations, a plurality of monitored receivers each tunable selectively to receiver program signals from different transmitting stations operating at different frequencies, means controlled in accordance with the tuning of each of said receivers for producing a signal indicative of the transmitting station from which program signals are received by the associated receiver, signal responsive comparison means provided with two sets of input terminals, sequencing means for sequentially impressing the signals produced by said first-named means upon one set of input terminals of said comparison means, monitoring wave signal receiving means for receiving program signals from a plurality of said transmitting stations, means connected to said monitoring receiving means for impressing upon the other set of input terminals of said comparison means signals representative of the transmitting stations from which program signals are received by said monitoring receiving means, said comparison means being operatively responsive to the signals impressed upon its input terminals to produce indications from which may be determined the transmitting stations to which said monitored receivers are selectively tuned for program signal reception, and additional means responsive to the tuning of each of said monitored receivers for controlling said comparison means to distinguish between two transmitting stations from which the same program signals are concurrently broadcast, said additional means including apparatus at said monitored receiver for modifying the signal transmitted from said monitored receiver to said monitoring station in a predetermined manner only when said monitored receiver is tuned to receive program signals from one of said two transmitting stations.

5. In a system for determining the audience response to programs broadcast from different wave signal transmitting stations, monitoring wave signal receiving apparatus for receiving program signals from two or more transmitting stations operating at different frequencies and for reproducing the audio frequency components of the received signals, a signal generator having a predetermined output frequency, means for mixing the reproduced audio frequency components of the signal received from one of said transmitting stations with a signal derived from said generator, thereby to produce a first composite signal, a monitored wave signal receiver selectively tunable to receive program signals from said two transmitting stations and including an audio frequency section in which the audio frequency components of the received signals are reproduced, a second signal generator operating at the same output frequency as said first signal generator, means for mixing the reproduced audio frequency components of the signal received by said monitored receiver with the signal derived from said second generator, thereby to produce a second composite signal, and comparison means excited by said two composite signals for producing an indication that said monitored receiver is receiving program signals from said one of said transmitting stations.

6. In a system for determining the audience response to programs broadcast from different wave signal transmitting stations, monitoring wave signal receiving apparatus for receiving program signals from two or more transmitting stations operating at different frequencies and for reproducing the audio frequency components of the received signals, a signal generator having a predetermined output frequency, means for mixing the reproduced audio frequency components of the signal received from one of said transmitting stations with a signal derived from said generator, thereby to produce a first composite signal, a monitored wave signal receiver selectively tunable to receive program signals from said two transmitting stations and including an audio frequency section in which the audio frequency components of the received signals are reproduced, a second signal generator operative to develop an output signal having the same frequency as the output frequency of said first signal generator only in response to tuning of said monitored receiver to receive program signals from said one transmitting station, means for mixing the reproduced audio frequency components of the signal received by said monitored receiver with the output signal of said second generator, thereby to produce a second composite signal having the same frequency composition as said first composite signal, and comparison means excited by said two composite signals for producing an indication that said monitored receiver is receiving program signals from said one of said transmitting stations.

7. In a system for determining the audience response to programs broadcast from different wave signal transmitting stations, a monitoring station including signal generating apparatus for producing a plurality of signals of different frequencies individually representing transmitting stations operating at different frequencies from which program signals may be received, a monitored wave signal receiver stationed in a collaborator home remotely located with respect to said monitoring station and selectively tunable to receive program signals from different ones of said transmitting stations, a signal generator at said collaborating home having a variable output frequency, frequency changing means responsive to tuning of said receiver for the reception of program signals from different ones of said transmitting stations for correspondingly changing the output frequency of said generator, a signal transmission link connecting said monitoring station with said generator and operative to transmit to said monitoring station the output signals of said generator, and comparison means at said monitoring station responsive to the signals developed by said signal generating apparatus and at the same time responsive to the signal transmitted to said monitoring station from said signal generator over said link for producing indications from which may be determined the transmitting stations to which said monitored receiver is tuned for program signal reception.

8. In a system for determining the audience response to programs broadcast from different wave signal transmitting stations, a monitoring station including signal generating apparatus for producing a plurality of signals of different frequencies individually representing transmitting stations operating at different frequencies from which program signals may be received, a monitored wave signal receiver stationed in a collaborator home remotely located with respect to said monitoring station and selectively tunable to receive program signals from different ones of said transmitting stations, a signal generator at said collaborating home having a variable output frequency, frequency control means responsive to tuning of said receiver for the reception of program signals from any one of said transmitting stations for equalizing the output frequency of said generator with the signal frequency of said signal generating apparatus which represents said one transmitting station, a signal transmission link connecting said monitoring station with said generator and operative to transmit to said monitoring station the output signal of said generator, and signal frequency comparison means at said monitoring station for comparing the signals developed by said signal generating apparatus with the signal transmitted to said monitoring station from said signal generator over said link, and means controlled by the output of said comparing means for indicating that said monitored receiver is tuned for program signal reception from said one transmitting station when the output frequencies of said signal generator and said signal generating apparatus are equalized.

9. In a system for determining the audience response to programs broadcast from different wave signal transmitting stations, monitoring wave signal receiving means for receiving program signals from said transmitting stations, signal generating means for generating signals having predetermined output frequencies, means for combining the program signals received by said monitoring receiving means from different ones of said transmitting stations with the output signals of said signal generating means to produce a plurality of composite signals, a monitored wave signal receiver selectively tunable to receive program signals from said transmitting stations, an additional signal generator operating at one of said predetermined output frequencies, means for combining program signals derived from said monitored receiver with the signal developed by said signal generator to produce another composite signal which may match one of said plurality of composite signals, and means for comparing said other composite signal successively with said plurality of composite signals to determine the one of said plurality of composite signals which matches said other composite signal and thereby identify the transmitting station from which program signals are being received by said monitored receiver.

10. In a system for determining the audience response to programs broadcast from different wave signal transmitting stations, monitoring wave signal receiving means for receiving program signals from said transmitting stations, signal generating means for producing at least two signals having different predetermined output frequencies, means for combining the program signals received by said monitoring receiving means from at least certain of said transmitting stations with each of the two signals produced by said signal generating means to produce a plurality of composite signals, a monitored wave signal receiver selectively tunable to receive program signals from said transmitting stations, an adjustable frequency signal generator operable at either of said two predetermined output frequencies, frequency control means responsive to tuning of said receiver for the reception of program signals from different ones of said transmitting stations for correspondingly changing the output frequency of said signal generator, means for combining program signals derived from said monitored receiver with the signal developed by said signal generator to produce another composite signal which may match one of said plurality of composite signals, and means for comparing said other composite signal successively with said plurality of composite signals to determine the one of said plurality of composite signals which matches said other composite signal and thereby identify the transmitting station from which program signals are being received by said monitored receiver.

11. In a system for determining the audience response to programs broadcast from different wave signal transmitting stations, a monitoring station including signal generating apparatus for producing a plurality of signals of different frequencies individually representing different ones of said transmitting stations, a monitored wave signal receiver stationed in a collaborator home remotely located with respect to said monitoring station and selectively tunable to receive program signals from different ones of said transmitting stations, a signal generator at said collaborating home having a variable output frequency, frequency control means responsive to tuning of said receiver for the reception of program signals from any one of said transmitting stations for setting the output frequency of said generator at a value which indicates that program signals are being received from said one transmitting station, a signal transmission link connecting said monitoring station with said generator and operative to transmit to said monitoring station the output signal of said generator, signal frequency comparison means at said monitoring station for comparing the signals developed by said signal generating apparatus with the signal transmitted to said monitoring station from said signal generator over said link, means for sequentially applying said plurality of signals of different frequencies to said signal frequency comparison means, means for applying the signal transmitted to said monitoring station over said link to said signal frequency comparison means, and means controlled by the output of said comparing means for indicating that said monitored receiver is tuned for program signal reception from said one transmitting station when a predetermined frequency relationship is established between the frequency of one of said plurality of signals and the frequency of the signal transmitted to said monitoring station over said link.

HENRY A. RAHMEL.

REFERENCES CITED

The following references are of record in the file of this patent:

UNITED STATES PATENTS

| Number | Name | Date |
| --- | --- | --- |
| 1,917,268 | Mirick | July 11, 1933 |
| 1,988,614 | Tuczek | Jan. 22, 1935 |
| 2,213,886 | Potter | Sept. 3, 1940 |
| 2,249,324 | Potter | July 15, 1941 |
| 2,342,167 | Potter | Feb. 22, 1944 |
| 2,354,836 | Rusch | Aug. 1, 1944 |
| 2,368,761 | Hogan | Feb. 6, 1945 |
| 2,381,940 | Wallace et al. | Aug. 14, 1945 |
| 2,397,562 | Potter | Apr. 2, 1946 |
| 2,432,214 | Sontheimer | Dec. 9, 1947 |
| 2,442,583 | Bliss | June 1, 1948 |
| 2,483,573 | Clark, Jr. | Oct. 4, 1949 |
| 2,573,279 | Scherbatskoy | Oct. 30, 1951 |